US012608565B2

(12) United States Patent
Calapodescu et al.

(10) Patent No.: US 12,608,565 B2
(45) Date of Patent: Apr. 21, 2026

(54) MULTIMODAL TEXT-TO-TEXT NEURAL MACHINE TRANSLATION USING NOISE AND DOMAIN ADAPTERS AND TRAINING NOISE ADAPTERS WHILE A DOMAIN ADAPTER IS FROZEN

(71) Applicant: NAVER CORPORATION, Seongnam-si (KR)

(72) Inventors: Ioan Calapodescu, Grenoble (FR); Yuting Zhao, Fukuoka (JP)

(73) Assignee: NAVER CORPORATION, Seongnam-si (KR)

( * ) Notice: Subject to any disclaimer, the term of this patent is extended or adjusted under 35 U.S.C. 154(b) by 313 days.

(21) Appl. No.: 18/490,047

(22) Filed: Oct. 19, 2023

(65) Prior Publication Data
US 2025/0131209 A1 Apr. 24, 2025

(51) Int. Cl.
| | |
|---|---|
| *G06F 40/47* | (2020.01) |
| *G06F 40/232* | (2020.01) |
| *G06F 40/284* | (2020.01) |
| *G06F 40/58* | (2020.01) |
| *G06N 3/04* | (2023.01) |
| *G06N 3/08* | (2023.01) |

(52) U.S. Cl.
CPC ............ *G06F 40/47* (2020.01); *G06F 40/232* (2020.01); *G06F 40/284* (2020.01); *G06F 40/58* (2020.01); *G06N 3/04* (2013.01); *G06N 3/08* (2013.01)

(58) Field of Classification Search
CPC ...... G06F 40/47; G06F 40/232; G06F 40/284; G06F 40/58; G06N 3/04; G06N 3/08
See application file for complete search history.

(56) References Cited

U.S. PATENT DOCUMENTS 10,452,978 B2 10/2019 Shazeer et al.
2023/0401391 A1* 12/2023 Zhang ................... G06F 40/284

FOREIGN PATENT DOCUMENTS

CN 114841176 * 8/2022 ........... G06F 40/232

OTHER PUBLICATIONS

Akiba Y., et al. "Overview of the IWSLT04 Evaluation Campaign," Proceedings of the First International Workshop on Spoken Language Translation: Evaluation Campaign, Sep. 30-Oct. 1, 2004, 12 pages.
Alam, M., et al. "Fine-Tuning MT Systems for Robustness to Second-Language Speaker Variations," Proceedings of the Sixth Workshop on Noisy User-Generated Text (W-NUT 2020), Nov. 19, 2020, pp. 149-158.

(Continued)

*Primary Examiner* — Farzad Kazeminezhad
(74) *Attorney, Agent, or Firm* — Greer, Burns & Crain, Ltd.

(57) ABSTRACT
Methods and systems for adapting a pretrained neural machine translation (NMT) model for translating text from a noisy input in a domain. A domain adapter injected into the pretrained NMT model is trained on clean in-domain data for adapting the pretrained NMT to the domain. Each of a plurality of individual noise adapters injected into the pretrained NMT model are trained on noisy input data from an individual noise source for adapting to the individual noise source.

29 Claims, 12 Drawing Sheets

(56) References Cited

OTHER PUBLICATIONS

Anastasopoulos, A., et al. "Neural Machine Translation of Text from Non-Native Speakers," Proceedings of the 2019 Conference of the North, Minneapolis, Minnesota: Association for Computational Linguistics, Jun. 2-7, 2019, pp. 3070-3080.

Antol, S., et al. "VQA: Visual Question Answering," 2015 IEEE International Conference on Computer Vision (ICCV), Santiago, Chile: IEEE, 2015, pp. 2425-2433.

Baek, Y., et al. "Character Region Awareness for Text Detection," published on arXiv: 1904.01941v1, Apr. 3, 2019, 12 pages.

Bañón, M., et al. "ParaCrawl: Web-Scale Acquisition of Parallel Corpora," Proceedings of the 58th Annual Meeting of the Association for Computational Linguistics, Online: Association for Computational Linguistics, Jul. 5-10, 2020, pp. 4555-4567.

Bapna, A., et al. "Simple, Scalable Adaptation for Neural Machine Translation," Proceedings of the 2019 Conference on Empirical Methods in Natural Language Processing and the 9th International Joint Conference on Natural Language Processing (EMNLP-IJCNLP), Hong Kong, China: Association for Computational Linguistics, Nov. 3-7, 2019, pp. 1538-1548.

Belinkov, Y., et al. "Synthetic and Natural Noise Both Break Neural Machine Translation," ICLR 2018, published on arXiv:1711. 02173v2, Feb. 24, 2018, 13 pages.

Bérard, A., et al. "Machine Translation of Restaurant Reviews: New Corpus for Domain Adaptation and Robustness," Proceedings of the 3rd Workshop on Neural Generation and Translation, Hong Kong: Association for Computational Linguistics, Nov. 4, 2019, pp. 168-176.

Bérard, A., et al. "Naver Labs Europe's Participation in the Robustness, Chat, and Biomedical Tasks at WMT 2020," Proceedings of the 5th Conference on Machine Translation (WMT), Online, Nov. 19-20, 2020, pp. 462-472.

Bérard, A., et al. "Naver Labs Europe's Systems for the WMT19 Machine Translation Robustness Task," published on arXiv:1907. 06488v1, Jul. 15, 2019, 7 pages.

Bernardi, R., et al. "Automatic Description Generation from Images: A Survey of Models, Datasets, and Evaluation Measures," Journal of Artificial Intelligence Research 55, Feb. 23, 2016, pp. 409-442.

Cheng, Y., et al. "Robust Neural Machine Translation with Doubly Adversarial Inputs," Proceedings of the 57th Annual Meeting of the Association for Computational Linguistics, Florence, Italy, Jul. 28-Aug. 2, 2019, pp. 4324-4333.

Cheng, Y., et al. "AdvAug: Robust Adversarial Augmentation for Neural Machine Translation," published on arXiv:2006.11834v3, Jul. 3, 2020, 10 pages.

Cheng, Y., et al. "Towards Robust Neural Machine Translation," Proceedings of the 56th Annual Meeting of the Association for Computational Linguistics (Long Papers), Melbourne, Australia, Jul. 15-20, 2018, pp. 1756-1766.

Dhole, K., et al. "NL-Augmenter: A Framework for Task-Sensitive Natural Language Augmentation," published on arXiv:2112. 02721v1, Dec. 6, 2021, 39 pages.

Ebrahimi, J., et al. "On Adversarial Examples for Character-Level Neural Machine Translation," Proceedings of the 27th International Conference on Computational Linguistics, Santa Fe, New Mexico, USA, Aug. 20-26, 2018, pp. 653-663.

Elliott, D., et al. "Findings of the Second Shared Task on Multimodal Machine Translation and Multilingual Image Description," Proceedings of the Second Conference on Machine Translation, Copenhagen, Denmark: Association for Computational Linguistics, Sep. 7-11, 2017, pp. 215-233.

Escolano, C., et al. "Enabling Zero-Shot Multilingual Spoken Language Translation with Language-Specific Encoders and Decoders," published on arXiv:2011.01097v2, Sep. 15, 2021, 8 pages.

Freitag, M., et al. "Complete Multilingual Neural Machine Translation," Proceedings of the 5th Conference on Machine Translation (WMT), Online, Nov. 19-20, 2020, pp. pp. 550-560.

Helcl, J., et al. "CUNI System for the WMT19 Robustness Task," published on arXiv:1906.09246v1, Jun. 21, 2019, 5 pages.

Houlsby, N., et al. "Parameter-Efficient Transfer Learning for NLP," ICML, Presentation, 2019, 15 pages.

Kannan, A., et al. "Large-Scale Multilingual Speech Recognition with a Streaming End-to-End Model," published on arXiv:1909. 05330v1, Sep. 11, 2019, 5 pages.

Mahabadi, R., et al. "Parameter-Efficient Multi-Task Fine-Tuning for Transformers via Shared Hypernetworks," Proceedings of the 59th Annual Meeting of the Association for Computational Linguistics and the 11th International Joint Conference on Natural Language Processing (vol. 1: Long Papers), Aug. 1-6, 2021, pp. 565-576.

Karpukhin, V., et al. "Training on Synthetic Noise Improves Robustness to Natural Noise in Machine Translation," Proceedings of the 2019 EMNLP Workshop W-NUT: The 5th Workshop on Noisy User-generated Text, Hong Kong, Nov. 4, 2019, pp. 42-47.

Khayrallah, H., et al. "On the Impact of Various Types of Noise on Neural Machine Translation," Proceedings of the 2nd Workshop on Neural Machine Translation and Generation, Melbourne, Australia: Association for Computational Linguistics, Jul. 20, 2018, pp. 74-83.

Koehn, P., et al. "Six Challenges for Neural Machine Translation," Proceedings of the First Workshop on Neural Machine Translation, Vancouver: Association for Computational Linguistics, Aug. 4, 2017, pp. 28-39.

Lee, T., et al. "Adaptable Multi-Domain Language Model for Transformer ASR," ICASSP 2021—2021 IEEE International Conference on Acoustics, Speech and Signal Processing (ICASSP), Toronto, ON, Canada: IEEE, 2021, 12 pages.

Li, X., et al. "Findings of the First Shared Task on Machine Translation Robustness," Proceedings of the Fourth Conference on Machine Translation (vol. 2: Shared Task Papers, Day 1), Florence, Italy: Association for Computational Linguistics, Aug. 1-2, 2019, pp. 91-102.

Li, X., et al. "Multilingual Speech Translation from Efficient Finetuning of Pretrained Models," Proceedings of the 59th Annual Meeting of the Association for Computational Linguistics and the 11th International Joint Conference on Natural Language Processing (vol. 1: Long Papers), Online: Association for Computational Linguistics, Aug. 1-6, 2021, pp. 827-838.

Li, Z., et al. "Visual Cues and Error Correction for Translation Robustness," Findings of the Association for Computational Linguistics: EMNLP 2021, Punta Cana, Dominican Republic: Association for Computational Linguistics, Nov. 7-11, 2021, pp. 3153-3168.

Li, Z., et al. "Improving Neural Machine Translation Robustness via Data Augmentation: Beyond Back-Translation," Proceedings of the 5th Workshop on Noisy User-Generated Text (W-NUT 2019), Hong Kong, China: Association for Computational Linguistics, 2019, pp. 328-336.

Lin, Z., et al. "Exploring Versatile Generative Language Model Via Parameter-Efficient Transfer Learning," Findings of the Association for Computational Linguistics: EMNLP 2020, Online: Association for Computational Linguistics, Nov. 16-20, 2020, pp. 441-459.

Michel, P., et al. "On Evaluation of Adversarial Perturbations for Sequence-to-Sequence Models," Proceedings of NAACL-HLT 2019, Minneapolis, Minnesota, Jun. 2-7, 2019, pp. 3103-3114.

Michel, P., et al. "MTNT: A Testbed for Machine Translation of Noisy Text," published on arXiv:1809.00388v1, Sep. 2, 2018, 11 pages.

Murakami, S., et al. "NTT's Machine Translation Systems for WMT19 Robustness Task," published on arXiv:1907.03927v1, Jul. 9, 2019, 8 pages.

Papineni, K., et al. "BLEU: A Method for Automatic Evaluation of Machine Translation," Proceedings of the 40th Annual Meeting on Association for Computational Linguistics—ACL '02, Philadelphia, Pennsylvania: Association for Computational Linguistics, Jul. 2002, pp. 311-318.

Pfeiffer, J., et al. "AdapterFusion: Non-Destructive Task Composition for Transfer Learning," published on arXiv: 2005.00247v3, Jan. 26, 2021, 17 pages.

Pfeiffer, J., et al. "MAD-X: An Adapter-Based Framework for Multi-Task Cross-Lingual Transfer," Proceedings of the 2020 Con-

(56) References Cited

OTHER PUBLICATIONS ference on Empirical Methods in Natural Language Processing (EMNLP), Online: Association for Computational Linguistics, 2020, pp. 7654-7673.

Philip, J., et al. "Monolingual Adapters for Zero-Shot Neural Machine Translation," Proceedings of the 2020 Conference on Empirical Methods in Natural Language Processing (EMNLP), Online: Association for Computational Linguistics, Nov. 16-20, 2020, pp. 4465-4470.

Pilault, J., et al. "Conditionally Adaptive Multi-Task Learning: Improving Transfer Learning in NLP Using Fewer Parameters & Less Data," ICLR Conference Paper 2021, published on arXiv:2009. 09139v2, Mar. 18, 2021, 21 pages.

Popović, M., "ChrF: Character n-Gram F-Score for Automatic MT Evaluation," Proceedings of the Tenth Workshop on Statistical Machine Translation, Lisbon, Portugal: Association for Computational Linguistics, Sep. 17-18, 2015, pp. 392-395.

Post, M., "A Call for Clarity in Reporting BLEU Scores," Proceedings of the Third Conference on Machine Translation: Research Papers, Belgium, Brussels: Association for Computational Linguistics, Nov. 1, 2018, pp. 186-191.

Post, M., et al. "JHU 2019 Robustness Task System Description," Proceedings of the Fourth Conference on Machine Translation (vol. 2: Shared Task Papers, Day 1), Florence, Italy: Association for Computational Linguistics, Aug. 1-2, 2019, pp. 552-558.

Rebuffi, S., et al. "Learning Multiple Visual Domains with Residual Adapters," 31st Conference on Neural Information Processing Systems (NIPS 2017), 2017, 11 pages.

Rebuffi, S., et al. "Efficient Parametrization of Multi-Domain Deep Neural Networks," 2018 IEEE/CVF Conference on Computer Vision and Pattern Recognition, 2018, pp. 8119-8127.

Salesky, E., et al. "Robust Open-Vocabulary Translation from Visual Text Representations," published on arXiv:2104.08211v1, Apr. 16, 2021, 13 pages.

Salesky, E., et al. "The Multilingual TEDx Corpus for Speech Recognition and Translation," Interspeech 2021, ISCA, Aug. 30-Sep. 3, 2021, pp. 3655-3659.

Shi, B., et al. "An End-to-End Trainable Neural Network for Image-Based Sequence Recognition and Its Application to Scene Text Recognition," published on arXiv:1507.05717v1, Jul. 21, 2015, 9 pages.

Specia, L., et al. "A Shared Task on Multimodal Machine Translation and Crosslingual Image Description," Proceedings of the First Conference on Machine Translation: vol. 2, Shared Task Papers, Berlin, Germany: Association for Computational Linguistics, Aug. 11-12, 2016, pp. 543-553.

Specia, L., et al. "Findings of the WMT 2020 Shared Task on Machine Translation Robustness," WMT 2020 Proceedings of the Fifth Conference on Machine Translation, Nov. 19-20, 2020, pp. 76-91.

Sperber, M., et al. "Toward Robust Neural Machine Translation for Noisy Input Sequences," Proceedings of the 14th International Workshop on Spoken Language Translation, Tokyo, Japan, Dec. 14-15, 2017, pp. 90-96.

Stickland, A., et al. "Multilingual Domain Adaptation for NMT: Decoupling Language and Domain Information with Adapters," published on arXiv:2110.09574v1, Oct. 18, 2021, 21 pages.

Stickland, A., et al. "BERT and PALs: Projected Attention Layers for Efficient Adaptation in Multi-Task Learning," Proceedings of the 36 th International Conference on Machine Learning, Long Beach, California, PMLR 97, 2019, 10 pages.

Üstün, A., et al. "Multilingual Unsupervised Neural Machine Translation with Denoising Adapters," published on arXiv:2110. 10472v1, Oct. 20, 2021, 13 pages.

Üstün, A., et al. "UDapter: Language Adaptation for Truly Universal Dependency Parsing," published on arXiv:2004.14327v2, Oct. 6, 2020, 14 pages.

Vaibhav, S., et al. "Improving Robustness of Machine Translation with Synthetic Noise," published on arXiv:1902.09508v2, Apr. 10, 2019, 5 pages.

Vaswani, A., et al. "Attention Is All You Need," 31st Conference on Neural Information Processing Systems (NIPS 2017), 2017, 11 pages.

Wang, C., et al., "CoVoST 2 and Massively Multilingual Speech-to-Text Translation," published on arXiv:2007.10310v3, Oct. 24, 2020, 6 pages.

Winata, G., et al. "Adapt-and-Adjust: Overcoming the Long-Tail Problem of Multilingual Speech Recognition," Interspeech 2021, ISCA, 2021, pp. 2451-2455.

Xu, W., et al. "Addressing the Vulnerability of NMT in Input Perturbations," published on arXiv:2104.09810v1, Apr. 20, 2021, 9 pages.

Zadeh, A., et al. "MOSI: Multimodal Corpus of Sentiment Intensity and Subjectivity Analysis in Online Opinion Videos," published on arXiv:1606.06259, Jun. 20, 2016, 10 pages.

Zhao, Y., et al. "Multimodal Robustness for Neural Machine Translation," Proceedings of the 2022 Conference on Empirical Methods in Natural Language Processing, Abu Dhabi, United Arab Emirates: Association for Computational Linguistics, Dec. 7-11, 2022, pp. 8505-8516.

Zhao, Y., et al. "Region-Attentive Multimodal Neural Machine Translation," Neurocomputing 476, Mar. 2022, pp. 1-13.

Zhao, Y., et al. "Word-Region Alignment-Guided Multimodal Neural Machine Translation," IEEE/ACM Transactions on Audio, Speech, and Language Processing 30, 2022 pp. 244-259.

Zheng, R., et al. "Robust Machine Translation with Domain Sensitive Pseudo-Sources: Baidu-OSU WMT19 MT Robustness Shared Task System Report," Proceedings of the Fourth Conference on Machine Translation (vol. 2: Shared Task Papers, Day 1), Florence, Italy: Association for Computational Linguistics, Aug. 1-2, 2019, pp. 559-564.

Gehring, J., et al., "Convolutional Sequence to Sequence Learning," Proceedings of the 34th International Conference on Machine Learning, Sydney, Australia, PMLR 70, 2017, 10 pages.

* cited by examiner

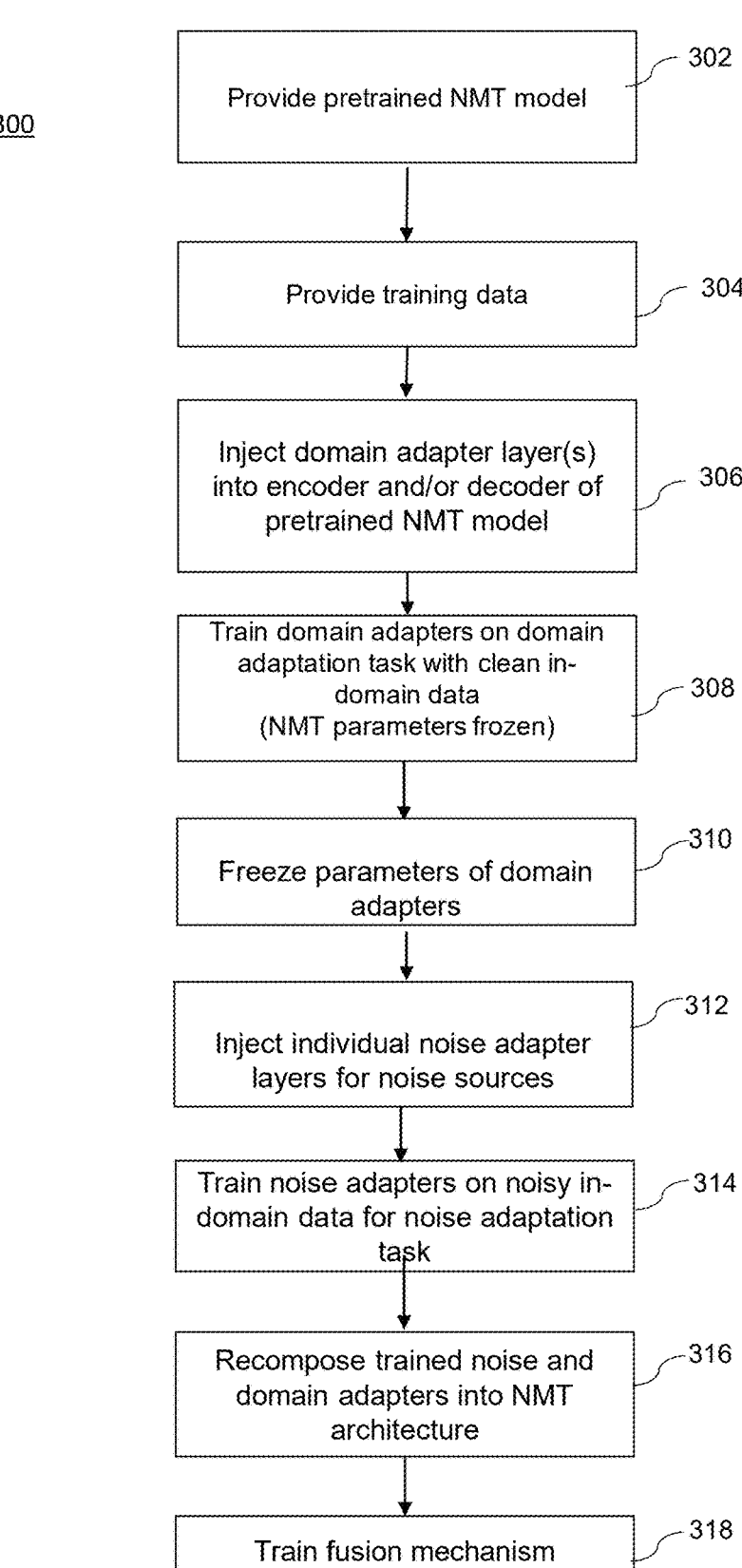

300

302
Provide pretrained NMT model

304
Provide training data

306
Inject domain adapter layer(s) into encoder and/or decoder of pretrained NMT model 308
Train domain adapters on domain adaptation task with clean in-domain data
(NMT parameters frozen)

310
Freeze parameters of domain adapters

312
Inject individual noise adapter layers for noise sources

314
Train noise adapters on noisy in-domain data for noise adaptation task

316
Recompose trained noise and domain adapters into NMT architecture

318
Train fusion mechanism

| Clean in-domain | Pour trier, il faut trois secondes. |
| Noise ASR | pourtrier il faut trois secondes |
| Noise OCR | Pour trier, -, Tl faut trois secondes |
| Noise UGC | Poug trier, il faut trois secondes |

406          404

| Data | Generic NMT BLEU($\Delta Clean$) | DA NMT BLEU($\Delta Clean$) | $\Delta DA$ |
|------|------|------|------|
| Clean | 40.37 (+0.00) | 43.65 (+0.00) | +3.28 |
| ASR | 16.53 (-23.84) | 20.09 (-23.56) | +3.56 |
| OCR | 20.18 (-20.19) | 25.20 (-18.45) | +5.02 |
| UGC | 27.53 (-12.84) | 31.56 (-12.09) | +4.03 |

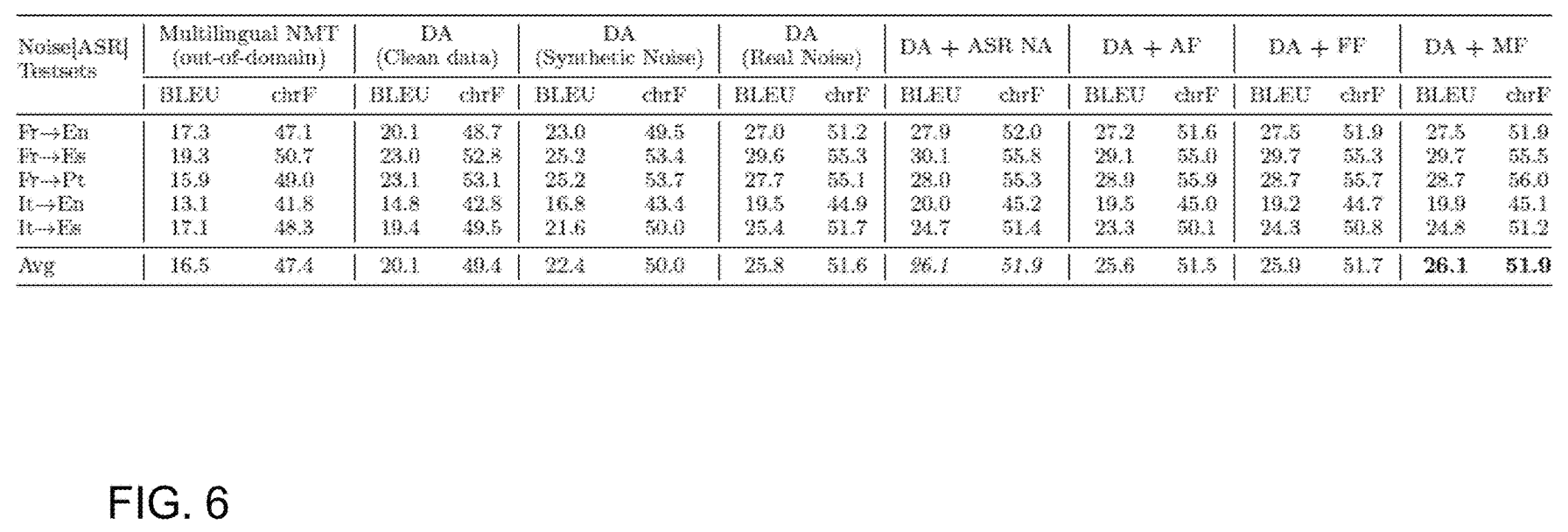

| Noise/ASR Testsets | Multilingual NMT (out-of-domain) | | DA (Clean data) | | DA (Synthetic Noise) | | DA (Real Noise) | | DA + ASR NA | | DA + AF | | DA + FF | | DA + MF | |
|---|---|---|---|---|---|---|---|---|---|---|---|---|---|---|---|---|
| | BLEU | chrF | BLEU | chrF | BLEU | chrF | BLEU | chrF | BLEU | chrF | BLEU | chrF | BLEU | chrF | BLEU | chrF |
| Fr→En | 17.3 | 47.1 | 20.1 | 48.7 | 23.0 | 49.5 | 27.0 | 51.2 | 27.9 | 52.0 | 27.2 | 51.6 | 27.5 | 51.9 | 27.5 | 51.9 |
| Fr→Es | 19.3 | 50.7 | 23.0 | 52.8 | 25.9 | 53.4 | 29.6 | 55.3 | 30.1 | 55.8 | 29.1 | 55.0 | 29.7 | 55.3 | 29.7 | 55.5 |
| Fr→Pt | 15.9 | 49.0 | 23.1 | 53.1 | 25.2 | 53.7 | 27.7 | 53.1 | 29.0 | 55.3 | 28.9 | 55.9 | 28.7 | 55.7 | 28.7 | 56.0 |
| It→En | 13.1 | 41.8 | 14.8 | 42.8 | 16.8 | 43.4 | 19.5 | 44.9 | 20.0 | 45.2 | 19.5 | 45.0 | 19.2 | 44.7 | 19.9 | 45.1 |
| It→Es | 17.1 | 48.3 | 19.4 | 49.5 | 21.6 | 50.0 | 25.4 | 51.7 | 24.7 | 51.4 | 25.3 | 50.1 | 24.3 | 50.8 | 24.6 | 51.2 |
| Avg | 16.5 | 47.4 | 20.1 | 49.4 | 22.4 | 50.0 | 25.8 | 51.6 | 26.1 | 51.9 | 25.8 | 51.5 | 25.9 | 51.7 | 26.1 | 51.9 |

FIG. 6

| Noisy[OCR] Testsets | Multilingual NMT (out-of-domain) | | DA (Clean data) | | DA (Synthetic Noise) | | DA (Real Noise) | | DA + ASR NA | | DA + AF | | DA + FF | | DA + MF | |
|---|---|---|---|---|---|---|---|---|---|---|---|---|---|---|---|---|
| | BLEU | chrF | BLEU | chrF | BLEU | chrF | BLEU | chrF | BLEU | chrF | BLEU | chrF | BLEU | chrF | BLEU | chrF |
| Fr→En | 23.1 | 52.5 | 23.9 | 53.8 | 27.4 | 54.7 | 36.2 | 59.9 | 36.0 | 59.8 | 35.8 | 59.7 | 36.3 | 59.9 | 35.5 | 59.5 |
| Fr→Es | 22.1 | 55.7 | 26.9 | 57.4 | 27.2 | 57.8 | 38.0 | 63.0 | 37.9 | 63.2 | 37.7 | 62.7 | 37.6 | 62.9 | 37.6 | 63.0 |
| Fr→Pt | 19.0 | 53.3 | 24.9 | 56.8 | 25.6 | 57.3 | 37.4 | 63.8 | 35.4 | 62.9 | 36.9 | 63.8 | 36.7 | 63.6 | 36.9 | 63.8 |
| It→En | 17.0 | 49.3 | 18.9 | 50.1 | 20.1 | 50.7 | 29.3 | 55.6 | 28.7 | 55.2 | 28.5 | 55.2 | 28.4 | 55.3 | 28.2 | 54.9 |
| It→Es | 20.6 | 56.1 | 24.9 | 57.8 | 26.1 | 58.4 | 37.0 | 63.2 | 37.6 | 63.7 | 33.6 | 61.3 | 34.6 | 61.9 | 35.9 | 62.8 |
| Es→En | 19.6 | 48.3 | 21.9 | 49.9 | 22.5 | 50.4 | 31.1 | 55.6 | 30.9 | 55.6 | 31.2 | 55.6 | 31.6 | 55.9 | 30.9 | 55.6 |
| Es→Fr | 19.9 | 51.1 | 23.0 | 52.0 | 23.8 | 52.7 | 31.3 | 57.1 | 31.5 | 57.2 | 28.9 | 54.9 | 30.3 | 56.0 | 30.9 | 56.6 |
| Es→It | 18.9 | 53.4 | 22.2 | 53.6 | 22.0 | 53.4 | 32.2 | 59.2 | 31.6 | 59.6 | 29.4 | 57.9 | 30.2 | 58.7 | 30.4 | 59.2 |
| Es→Pt | 22.6 | 55.7 | 27.3 | 57.2 | 28.9 | 58.8 | 39.7 | 65.0 | 39.0 | 64.6 | 39.1 | 65.2 | 39.6 | 64.8 | 39.6 | 65.0 |
| Pt→En | 21.4 | 52.3 | 24.9 | 54.3 | 26.1 | 54.7 | 35.7 | 60.4 | 34.8 | 59.8 | 34.5 | 60.0 | 35.1 | 60.3 | 35.3 | 60.1 |
| Pt→En | 24.7 | 58.9 | 39.9 | 61.3 | 30.2 | 61.7 | 41.8 | 67.1 | 41.5 | 67.0 | 41.2 | 67.3 | 41.4 | 67.2 | 41.3 | 67.2 |
| El→En | 4.6 | 33.8 | 7.1 | 35.1 | 7.4 | 35.9 | 17.6 | 44.6 | 17.3 | 44.1 | 16.4 | 43.6 | 17.6 | 44.2 | 17.2 | 44.1 |
| Avg | 19.4 | 51.7 | 23.2 | 53.3 | 23.9 | 54.0 | 33.9 | 59.5 | 33.5 | 59.4 | 32.7 | 58.9 | 33.3 | 59.2 | 33.3 | 59.3 |

FIG. 7

| Noise[UCC] Testsets | Multilingual NMT (out-of-domain) | | DA (Clean data) | | DA (Synthetic Noise) | | DA (Real Noise) | | DA + ASR NA | | DA + AF | | DA + FF | | DA + MF | |
|---|---|---|---|---|---|---|---|---|---|---|---|---|---|---|---|---|
| | BLEU | chrF | BLEU | chrF | BLEU | chrF | BLEU | chrF | BLEU | chrF | BLEU | chrF | BLEU | chrF | BLEU | chrF |
| Fr→En | 29.9 | 54.1 | 32.2 | 55.1 | 35.9 | 57.9 | 40.6 | 61.6 | 40.9 | 61.7 | 39.6 | 60.9 | 39.3 | 60.8 | 39.2 | 60.6 |
| Fr→Es | 29.9 | 56.6 | 34.9 | 59.1 | 37.7 | 61.6 | 42.3 | 65.0 | 42.5 | 64.9 | 41.6 | 64.4 | 42.3 | 64.9 | 41.8 | 64.8 |
| Fr→Pt | 25.3 | 54.1 | 32.4 | 58.3 | 35.3 | 60.8 | 41.8 | 65.7 | 41.1 | 65.0 | 41.5 | 65.7 | 41.3 | 65.3 | 41.2 | 65.3 |
| It→En | 22.9 | 49.6 | 25.0 | 51.1 | 27.9 | 53.7 | 31.7 | 57.0 | 31.9 | 57.0 | 31.2 | 56.5 | 30.9 | 56.5 | 31.3 | 56.7 |
| It→Es | 29.7 | 56.8 | 33.4 | 59.2 | 36.4 | 61.6 | 40.4 | 64.8 | 41.0 | 65.2 | 37.9 | 63.3 | 39.2 | 63.9 | 40.3 | 64.7 |
| Es→En | 25.3 | 49.7 | 27.5 | 51.4 | 30.0 | 54.1 | 34.1 | 57.6 | 34.0 | 57.3 | 34.4 | 57.8 | 33.8 | 57.4 | 33.7 | 57.5 |
| Es→Fr | 25.8 | 51.8 | 29.1 | 53.6 | 32.1 | 56.3 | 34.0 | 58.4 | 35.3 | 59.3 | 32.0 | 56.7 | 33.3 | 57.8 | 34.3 | 58.6 |
| Es→It | 26.0 | 54.1 | 28.1 | 55.3 | 31.0 | 58.1 | 34.5 | 60.9 | 34.6 | 61.1 | 33.2 | 59.8 | 33.0 | 60.1 | 33.7 | 60.1 |
| Es→Pt | 30.0 | 57.9 | 35.2 | 60.3 | 39.5 | 62.9 | 44.9 | 67.5 | 43.8 | 66.8 | 44.2 | 67.2 | 44.9 | 67.2 | 44.7 | 67.2 |
| Pt→En | 27.5 | 52.9 | 30.4 | 54.9 | 34.0 | 56.0 | 39.0 | 62.0 | 38.4 | 61.7 | 38.6 | 61.9 | 38.7 | 61.6 | 37.9 | 61.4 |
| Pt→Es | 32.2 | 60.6 | 36.4 | 62.8 | 40.6 | 65.6 | 45.7 | 69.5 | 45.8 | 69.4 | 45.7 | 69.5 | 45.8 | 69.5 | 45.6 | 69.4 |
| El→En | 31.5 | 55.3 | 33.1 | 56.4 | 33.4 | 56.5 | 32.3 | 55.7 | 32.9 | 56.3 | 28.9 | 52.9 | 36.8 | 54.4 | 31.7 | 55.0 |
| Avg | 28.0 | 54.5 | 31.5 | 56.5 | 34.5 | 58.9 | 38.4 | 62.1 | 38.5 | 62.1 | 37.4 | 61.4 | 37.8 | 61.6 | 38.0 | 61.8 |

FIG. 8

| Noise[Synthetic] Testsets | Multilingual NMT | | DA | | DA + AF | | DA + FF | | DA + MF | |
|---|---|---|---|---|---|---|---|---|---|---|
| | BLEU | chrF | BLEU | chrF | BLEU | chrF | BLEU | chrF | BLEU | chrF |
| Fr→En | 39.1 | 61.3 | 41.1 | 62.3 | 41.2 | 62.4 | 41.2 | 62.6 | 41.6 | 62.8 |
| Fr→Es | 39.3 | 64.0 | 44.0 | 66.2 | 44.1 | 66.0 | 44.6 | 66.5 | 43.9 | 66.5 |
| Fr→Pt | 33.0 | 61.3 | 42.1 | 66.0 | 43.5 | 67.2 | 43.1 | 66.9 | 42.8 | 66.9 |
| It→En | 32.0 | 58.3 | 34.1 | 59.3 | 34.1 | 59.2 | 34.1 | 59.2 | 34.2 | 59.3 |
| It→Es | 40.8 | 66.4 | 42.8 | 67.7 | 41.7 | 66.2 | 42.6 | 66.8 | 43.3 | 67.5 |
| Es→En | 32.2 | 56.6 | 34.5 | 58.2 | 34.8 | 58.4 | 35.1 | 58.7 | 35.1 | 58.9 |
| Es→Fr | 33.1 | 59.0 | 36.5 | 60.2 | 32.7 | 57.4 | 34.9 | 59.1 | 36.2 | 60.1 |
| Es→It | 32.9 | 61.0 | 35.0 | 60.9 | 34.3 | 60.4 | 34.2 | 60.7 | 34.9 | 61.4 |
| Es→Pt | 38.9 | 64.8 | 44.1 | 67.4 | 44.9 | 67.8 | 45.7 | 68.1 | 45.8 | 68.4 |
| Pt→En | 37.0 | 61.8 | 39.9 | 63.2 | 40.1 | 63.3 | 40.7 | 63.6 | 40.4 | 63.4 |
| Pt→Es | 42.5 | 68.4 | 46.8 | 70.5 | 47.0 | 70.8 | 48.1 | 71.1 | 47.0 | 71.2 |
| El→En | 29.4 | 53.6 | 30.8 | 54.5 | 27.6 | 51.2 | 29.5 | 52.9 | 30.0 | 53.5 |
| Avg | 35.9 | 61.4 | 39.3 | 63.0 | 38.8 | 62.5 | 39.5 | 63.0 | 39.7 | 63.3 |

MULTIMODAL TEXT-TO-TEXT NEURAL MACHINE TRANSLATION USING NOISE AND DOMAIN ADAPTERS AND TRAINING NOISE ADAPTERS WHILE A DOMAIN ADAPTER IS FROZEN

FIELD

The present disclosure relates generally to machine learning methods and systems, and more particularly to methods and systems for neural language models for machine translation using noisy inputs.

BACKGROUND

Neural machine translation (NMT) has achieved significant performance to date but still suffers from various robustness problems resulting from noisy inputs. Several solutions have been proposed to address such problems, including training using synthetic noise along with data augmentation or other adversarial methods. However, these solutions have been based on purely artificial noise and do not necessarily provide optimal results on real noise.

Other proposed solutions employ real noisy data to fine-tune or adapt generic models so that they become more robust to realistic noise distributions. However, such noise specific methods have not generalized well on domains or on noise distributions not seen at training time.

SUMMARY

Provided herein, among other things, are methods and systems for adapting a pretrained neural machine translation (NMT) model for translating text from a noisy input in a domain. A method comprises training, using one or more processors, a domain adapter injected into the pretrained NMT model on clean in-domain data for adapting the pretrained NMT to the domain, wherein the pretrained NMT model comprises an encoder including an encoder attention mechanism and encoder feed forward layer and a decoder including a decoder attention mechanism and decoder feed forward layer; and separately training, using one or more processors, each of a plurality of individual noise adapters injected into the pretrained NMT model, wherein each of the individual noise adapters is respectively trained on noisy input data from an individual noise source for adapting to the individual noise source.

Other embodiments provide, among other things, an adapted neural machine translation (NMT) model for translating text from a noisy input in a domain. The adapted NMT model can be implemented by one or more processors and memory. A pretrained encoder includes an attention mechanism and a feed forward layer, the encoder receiving the noisy input and generating an encoder output. A pretrained decoder includes an attention mechanism and a feed forward layer, the decoder receiving the encoder output and generating a decoder output corresponding to translated text. A domain adapter is injected downstream of the feed forward layer in the encoder and the decoder, the domain adapter being trained on clean in-domain data. A plurality of individual noise adapters are injected into the encoder and the decoder downstream of the feed forward layer and upstream of said domain adapter, each of the individual noise adapters being separately trained on noisy input data from a respective individual noise source for adapting to the individual noise source.

According to a complementary aspect, the present disclosure provides a computer program product, comprising code instructions to execute a method according to the previously described aspects; and a computer-readable medium, on which is stored a computer program product comprising code instructions for executing a method according to the previously described embodiments and aspects. The present disclosure further provides one or more processors configured using code instructions for executing a method according to the previously described embodiments and aspects.

Other features and advantages of the invention will be apparent from the following specification taken in conjunction with the following drawings.

DESCRIPTION OF THE DRAWINGS

The accompanying drawings are incorporated into the specification for the purpose of explaining the principles of the embodiments. The drawings are not to be construed as limiting the invention to only the illustrated and described embodiments or to how they can be made and used. Further features and advantages will become apparent from the following and, more particularly, from the description of the embodiments as illustrated in the accompanying drawings, wherein:

FIG. 3 shows an example training method for adapting an NMT architecture.

FIG. 6 shows BLEU and chrF scores on noisy ASR data, where Multilingual NMT out-of-domain is a generic NMT model trained on out-of-domain Paracrawl data, DA (Clean data) is a domain adapted model according to an example embodiment trained on clean mTEDx data, DA (Synthetic Noise) is an adapter layer according to an example embodiment trained on synthetically generated noisy mTEDx data, DA (Real Noise) is the same but trained on the real type noisy mTEDx data, DA+X-NA is an experiment showing a decomposed DA and a specific NA for noise X. DA-(AF|FF|MF) are decomposed DA and NA with an example fusion mechanism for when the type of noise is unknown and the model combines the noise adapters present in the model, and where italics show the best scores in an Oracle mode (when the noise source is known) and in bold are the best scores for the Blind mode (when the type of noise in input is not known).

FIG. 7 shows corresponding correBLEU and chrF scores on noisy OCR data.

FIG. 8 shows corresponding BLEU and chrF scores on noisy UGC data.

FIG. 10 shows results of an evaluation of transfer learning abilities of fusion layers according to example embodiments to an unknown type of noise (synthetic). AF/FF/MF are trained on noisy (UGC/OCR/ASR) data and tested on unknown synthetic noise.

In the drawings, reference numbers may be reused to identify similar and/or identical elements.

DETAILED DESCRIPTION

Example systems and methods herein provide, among other things, text-to-text models, such as but not limited to neural machine translation (NMT) models, that include adapters for adapting to new domains and/or improving robustness to various sources of noise, and methods for training such models. Example systems and methods can adapt an NMT model, for instance, to translate sequences from a clean domain and from respective noisy versions, even when the noise originates from any of various sources or modalities or when the model was previously trained for a different domain.

Example adapters may be composable, transferable, and/or trainable. Example adapters include trained domain adapters and modality-specific adapters, which can be separately learnt during training for addressing diverse and/or noisy input coming from various sources.

Example systems and methods further include adapted text-to-text models, e.g., text-to-text models trained according to example methods, which can operate with clean in-domain data (i.e., data that belongs to the same domain as the model being trained) and noisy versions of the same data originating from various distributions (domains). Example noise sources include, but are not limited to, automatic speech recognition (ASR) systems, optical character recognition (OCR) systems, or sources of user-generated content (UGC) from social media (e.g., with the presence of errors such as typographical errors or spelling errors).

Some example NMT models herein are adapted to consider the problem of robustness when receiving data from several domains respectively having various noise modalities, such as but not limited to speech, images, noisy text (e.g., extracted from the web), etc., and can be made general to such domains. Such a problem can be referred to as multimodal robustness.

Example systems and methods for adapting text-to-text models can address multimodal robustness using adapters. Adapters may be combined at runtime, such as via dynamic routing or via transfer learning methods, nonlimiting examples of which are referred to herein as fast fusion and multi fusion. Example methods can provide a flexible architecture capable of handling noisy multimodal inputs from sources that generate noisy data (i.e., data that is corrupted, distorted, or has a low signal-to-noise ratio), whether identified and employed during training or from additional noisy data sources.

Figure 1:
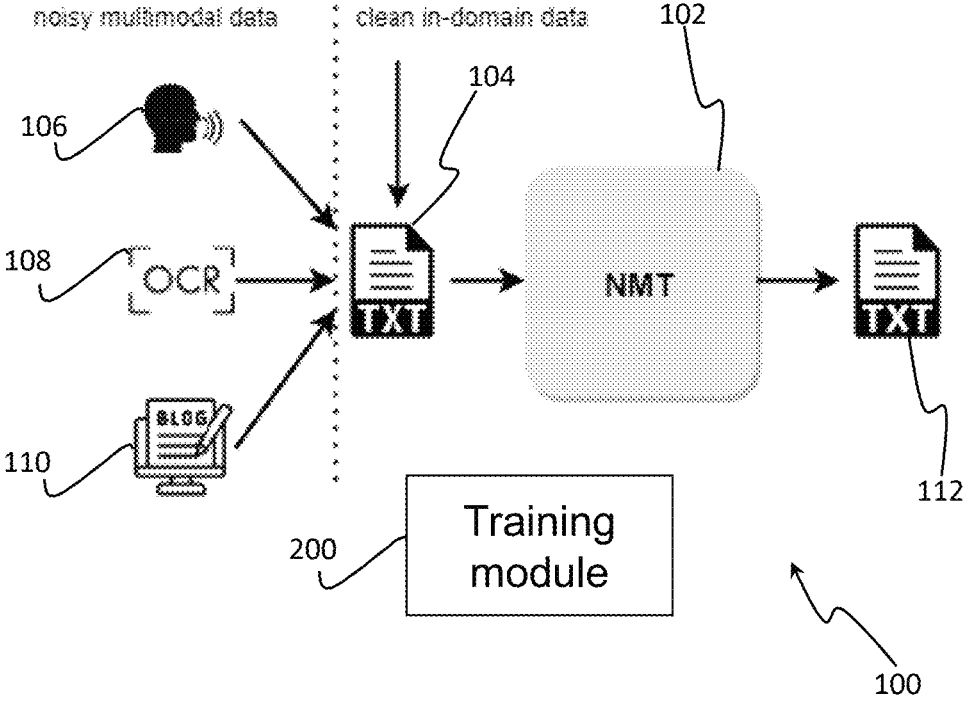
FIG. 1 shows an example environment for a neural machine translation (NMT) model.

Turning now to the drawings, FIG. 1 shows an example environment 100 for a text-to-text model, embodied here in a neural machine translation (NMT) model 102. The NMT model 102 may be trained (adapted) according to example training methods provided herein to be robust to clean in-domain data 104 on a particular domain as well as to noisy multimodal data (that is, data from different modalities, which respectively are sources of noise or absence of noise) on that domain.

An example NMT 102 for which data robustness is useful is an NMT having an attention-based architecture that may receive multimodal data inputs. Example multimodal data inputs include data (e.g., text) in a particular domain that may be subject to multiple modes of noise from various noise sources, including sources of no or imperceivable noise (i.e., clean data 104). For illustration, the example sources (modes) shown in FIG. 1 are noisy data sources including automated speech recognition (ASR) 106, optical character recognition (OCR) 108, user generated content (UGC) 110, and clean data source 104.

An example attention-based architecture for the NMT 102 is a transformer architecture having an encoder and a decoder. The adapted example NMT model 102 can perform a machine translation task on input data from various types and/or sources of noise, e.g., sources 106, 108, 110 as well as from clean in-domain data 104 to generate output translated text 112.

Figure 2:
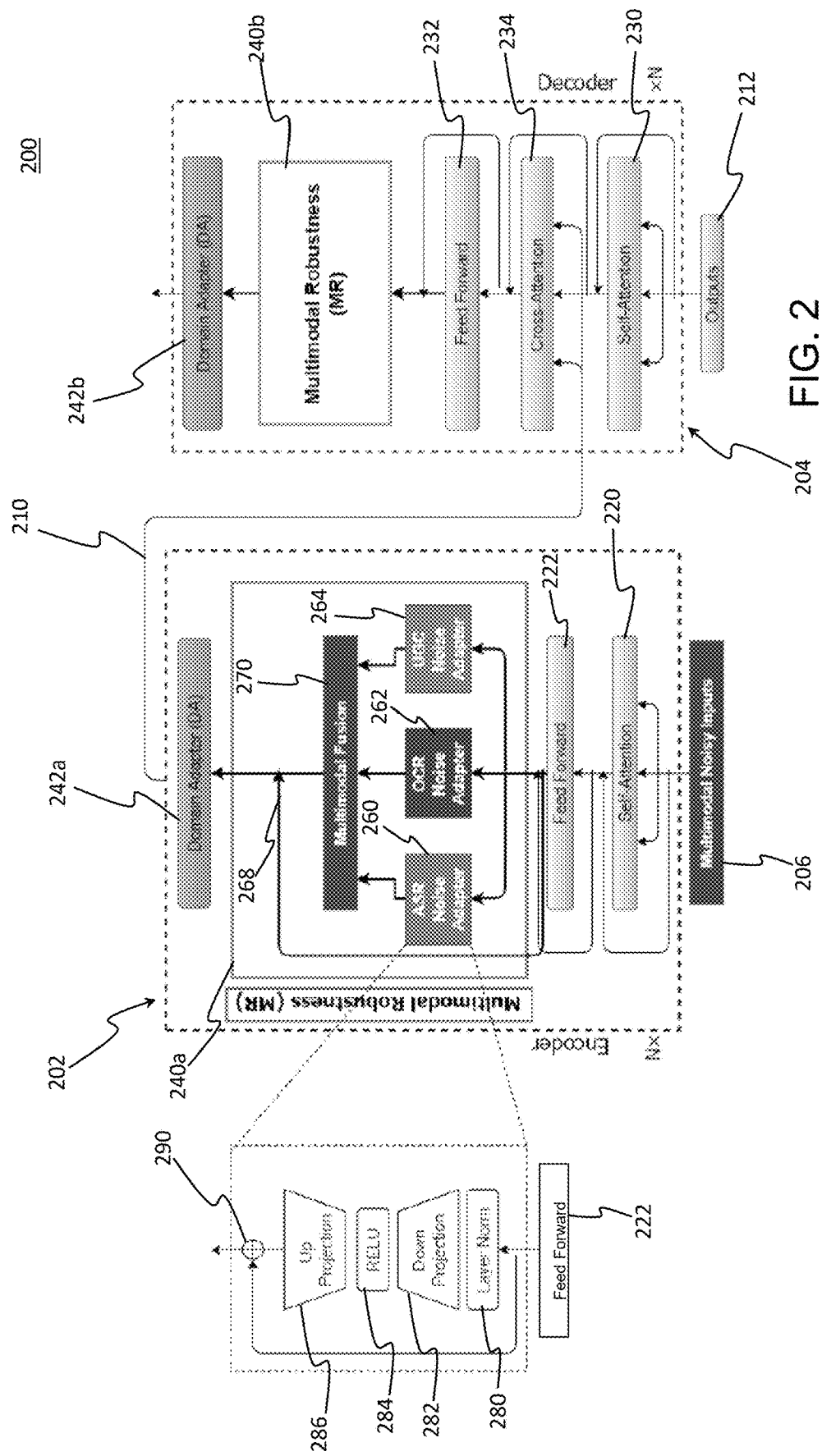
FIG. 2 shows an example robust multimodal NMT model architecture for the NMT model shown in FIG. 1.

FIG. 2 shows an example robust multimodal NMT model architecture 200, e.g., for the NMT model 102 shown in FIG. 1. The example NMT architecture 200, which may be implemented by one or more processors and memory, generally includes an encoder 202 and a decoder 204, which are adapted according to example methods herein. Example encoders and decoders that may be adapted to provide the encoder 202 and decoder 204 may include features of a transformer encoder-decoder architecture such as disclosed in U.S. Pat. No. 10,452,978, issued Oct. 22, 2019 ('978 patent), which is incorporated by reference herein.

In operation, the encoder 202 may receive a data input 206, such as one or more tokens (e.g., text) or other input in a first language, and generate an encoder output 210, e.g., a hidden state or an embedding. The decoder 204 receives the encoder output 210 from the encoder 202 and generates a decoder output 212 such as a sequence of tokens (e.g., text) in a second language. The data input 206 can be, for instance, from a particular domain or distribution, and may be from one or more data sources providing different modes of noise (including no noise), and thus the data input 206 can be referred to as including multimodal noisy inputs.

The example encoder 202 can have a depth of Nx layers (N being one or more), and can include a self-attention layer 220 and a feedforward layer 222. The example decoder 204 can have a depth of xN layers (N being one or more, and N may be but need not be the same N as in the encoder 202) includes a self-attention layer 230, a feed forward layer 232, and a cross-attention layer 234 that receives the encoder output 210 from the encoder 202 (e.g., from the Nth layer of the encoder). Additional possible features of example self-attention layers 220, 230, feed forward layers 222, 232, and cross-attention layers 234 are disclosed in more detail in the '978 patent. The self-attention layer 220 inside the encoder 202, and the self-attention layer 230 and cross-attention layer 234 inside the decoder 204, for instance, can be embodied in multi-head attention mechanisms, such as disclosed in the '978 patent. As the layers disclosed herein may include one or more internal or stacked layers (e.g., N layers as shown in FIG. 2), reference herein to a "layer" or "layers" may refer to a single layer or to each of multiple layers where practicable.

To improve robustness of the NMT architecture 200 to the multimodal noisy inputs 206, trainable multimodal noise adapter layers 240a, 240b and trainable domain adapter layers 242a, 242b are incorporated into the encoder 202 and/or the decoder 204, and preferably in both the encoder and the decoder. The multimodal noise adapter layers 240a, 240b are configured and trained to adapt the NMT architecture 200 for robustness to multiple noise modes, and are thus referred to herein as multimodal robustness (MR) adapter layers. The domain adapter layers 242a, 242b are configured and trained to adapt the NMT architecture 200 to one or more particular domains or distributions, and are thus referred to herein as domain adapters (DA). It is possible that the NMT architecture 200 may include either the MR adapter layers 240a, 240b or the domain adapters 242a, 242b. In the example NMT architecture 200, both the MR adapter layers 240a, 240b and the domain adapters 242a, 242b are provided in the encoder 202 and the decoder 204.

The MR adapter layer 240a is disposed (e.g., inserted) in the encoder 202 downstream of the encoder feed-forward layer 222, and the MR adapter layer 240b is disposed (e.g., inserted) in the decoder 204 downstream of the decoder feed-forward layer 232. It will be appreciated that "upstream" may refer to being directly upstream, or to being upstream with one or more optional intervening layers. Similarly, it will be appreciated that "downstream" may refer to being directly downstream, or to being downstream with one or more optional intervening layers.

FIG. 2 shows example components of the MR adapter layer 240a integrated within the encoder 202 for illustration. Although for clarity only the example components of the encoder MR adapter layer 240b are illustrated in FIG. 2, the same or similar components of the MR adapter layer 240a of the encoder 202 can also be provided (with same or separately trainable parameters) in the decoder MR adapter layer 240b.

The MR adapter layers 240a, 240b (referred to as encoder and decoder MR adapter layers, respectively) each include one or more (as shown in the example NMT architecture 200, three) individual noise adapter layers (noise adapters) 260, 262, 264, each of which being respectively trained for a noise adaptation task for each of one or more noise source modes. The noise source modes accounted for via the individual noise adapters 260, 262, 264 can be any noise source mode that may be known or expected to provide inputs via the multimodal noisy input 206. In the example NMT architecture 200, the individual noise adapters are embodied in an ASR noise adapter 260 (expanded to show example adapter component layers, as provided below), an OCR noise adapter 262, and a UGC noise adapter 264. The example individual noise adapters 260, 262, 264, respectively correspond to data from the three example noise sources (modes) 106, 108, 110 shown in FIG. 1. Likewise, the decoder MR adapter layer 240b can include the individual noise adapters 260, 262, 264, with the same or separate trainable parameters.

As explained below, depending on the noise source of the multimodal noisy input 206, an output of the encoder feedforward layer 222 can be dynamically routed to one of the individual noise adapters 260, 262, 264 associated with that noise source in the encoder MR adapter layer 240a. Similarly, depending on the noise source of the multimodal noisy input 206, an output of the decoder feedforward layer 232 can be dynamically routed to one of the individual noise adapter 260, 262, 264 associated with that noise source in the decoder MR adapter layer 240b.

The domain adapters 242a, 242b (referred to as encoder DA and decoder DA, respectively) are additional adapter layers in the encoder 202 and the decoder 204, respectively, that are trained for a domain adaptation task, i.e., adapting the NMT architecture 200 to process inputs from a particular domain or distribution (or particular group of domains or distributions). The encoder domain adapter (DA) 242a is disposed (e.g., inserted or injected) in the encoder 202 downstream of the encoder feedforward layer 222, e.g., downstream of the encoder MR adapter layer 240a, and upstream of the output 210 of the encoder to the cross-attention layer 234. The decoder DA 242b is disposed (e.g., inserted or injected) in the decoder 204 downstream of the decoder feedforward layer 232, e.g., downstream of the decoder MR adapter layer 240b, and upstream of the decoder output 212.

In the example NMT architecture 200, both the encoder MR adapter layer 240a (including noise adapters 260, 262, 264 therein) and the encoder DA 242a are disposed between the encoder feedforward layer 222 and the output 210 of the encoder 202. Similarly, both the MR adapter layer 240b (including noise adapters 260, 262, 264 therein) and the DA 242b are disposed between the decoder feedforward layer 232 and the output 212 of the decoder 204.

The encoder and decoder MR adapter layers 240a, 240b further can each include a multimodal fusion layer 270. The optional multimodal fusion layer 270 is a layer configured and trained for combining (e.g., merging) knowledge from several or all of the individual noise adapters 260, 262, 264, and can account for noisy text from noisy sources for which specific noise adapters are not provided, as well as accounting for clean text (which can be considered an additional "noise source" for which an individual noise adapter has not been provided). Further details of example multimodal fusion layers 270 are provided herein. The multimodal fusion layer 270 can be disposed (e.g., inserted or injected) in the encoder and decoder MR layers 240a, 240b, e.g., downstream of the noise adapters 260, 262, 264, but may also be connected to the encoder and decoder feedforward layers 222 via a residual connection 268, as illustrated in FIG. 2. The multimodal fusion layer may be, for instance, disposed within the MR adapter layer downstream of the noise adapters.

An example adapter layer structure with internal components is shown in FIG. 2 for the ASR noise adapter 260 in the encoder MR layer 240a. The same or similar adapter layer structure for the noise adapter 260 may be provided for each individual noise adapter 260, 262, 264 and/or for each of the encoder and decoder domain adapters 242a, 242b. However, it is also contemplated that one or more of the adapter layer structures may vary for the individual noise adapters 260, 262, 264 or for the domain adapters 242a, 242b.

The example ASR noise adapter 260 in the MR layer 240a (or the OCR noise adapter 262 or the UGC noise adapter 264) receives an input from the encoder feedforward layer 222, as shown in FIG. 2. Similarly, noise adapters in the MR layer 240b receive an input from decoder feedforward layer 232, the domain adapter 242a receives an input from the MR layer 240a, and the domain adapter 242b receives an input from the MR layer 240b. The example adapter layer structure includes a layer normalization layer 280, a down projection layer 282 from an initial embedding size to a bottleneck dimension, e.g., with an activation 284 such as ReLU, followed by an up projection layer 286 to the initial embedding size, followed by a residual connection 290. The adapter layer structure is separately trainable by optimizing model parameters, such as weights for the down projection layer 282 and the up projection layer 286 for adapting for particular noise types or modes (noise adapters) and for particular domains (domain adapters). A nonlimiting example adapter layer structure is embodied in a so-called Houlsby adapter (Houlsby et al., "Parameter-efficient transfer learning for NLP", In ICML, 2019), or in a classical adapter. However, other adapter layer structures are possible so long as the layers in the adapter 260, 262, 264, 242*a*, 242*b* can be trained separately (e.g., updating parameters of an adapter to be trained while freezing other parameters of the NMT architecture 200 in which one or more adapters are inserted). As the encoder 202 and decoder 204 may each include multiple layers N, similarly the adapters 260, 262, 264, 242*a*, 242*b* may include multiple layers N.

As used herein, domains may be provided by any data distribution or dataset that differs in any significant way from another domain. As nonlimiting examples, two domains may vary, e.g., by their data source, data type, data modality, their noise source (including noisy or absence of noise (clean)), etc. Domain spaces may be discrete or continuous, and differences may be substantial or slight shifts, or a combination. Multiple domains may be provided for the same general source of noise, and multiple sources of noise may provide data distributions for the same general domain. Domains may be variations of other (clean or noisy) domains. For instance, one or more transformations (including sequences of transformations) may be applied to data in one domain to provide additional domains.

FIG. 3 shows an example training method 300 for adapting an NMT architecture, such as the NMT architecture 200, for domain adaptation and noise adaptation. The example training method 300 may take place for adapting an NMT architecture that has not previously been adapted for improved robustness to noise and domains. Alternatively, the example training method 300 may take place for an NMT architecture that has previously been adapted for noise and domains and is currently being adapted for additional sources of noise and/or additional domains.

In the example training method 300, domain adaptation and noise adaptation are learned separately. The training method 300 generally begins at 302 with providing a pretrained text-to-text (e.g., NMT) model, such as an NMT model that is trained for a machine translation task including receiving a text input (or non-text input that has been transformed into text) in a first language and generating an output text in a second language. Example methods for training NMT models for a machine translation task will be appreciated by those of ordinary skill in the art. The pretrained NMT model may be trained for translating text in one or more previously known domains.

The pretrained NMT model may include the transformer encoder-decoder architecture 200 shown in FIG. 2 (transformer cell) or other encoder-decoder architecture, including the encoder 202 and the decoder 204. If the NMT architecture 200 has not previously been adapted for noise (e.g., from previously known noise sources) or domain adaptation (e.g., from previously known domains), the encoder and decoder MR adapter layers 240*a*, 240*b* and the DA layers 242*a*, 242*b* shown in FIG. 2 may not initially be injected in the encoder 202 and the decoder 204. However, if the NMT architecture 200 has previously been adapted for noise and/or domain adaptation, the MR layers 240*a*, 240*b* (with previous noise adapters such as noise adapters 260, 262, 264) and/or the DA layers 242*a*, 242*b* (for previously known domains) may have been integrated in the encoder 202 and the decoder 204.

The NMT architecture 200 shown in FIG. 2 is shown in a state after the MR layers 240*a*, 240*b* and DA layers 242*a*, 242*b* are integrated. The MR adapter layers 240*a*, 240*b*, and the domain adapters 242*a*, 242*b* may each be removed and reinserted in various ways as provided below for new adaptation training. In some embodiments, if the DA layers 242*a*, 242*b* are adapted before the encoder and decoder MR adapter layers 240*a*, 240*b*, the MR layers 240*a*, 240*b* may, but need not, be removed while the encoder and decoder DA layers 242*a*, 242*b* remain inserted and newly adapted, and then the encoder and decoder MR adapter layers 240*a*, 240*b* may be reinserted and adapted. Alternatively, the trained MR layers 240*a*, 240*b* may remain in the NMT model (e.g., and optionally frozen) and the DA layers 242*a*, 242*b* may be trained for adapting to a new domain.

In some example embodiments, adapting the NMT architecture 200 for a new domain will also result in noise adapting from the new domain, and thus before domain adaptation the MR adapter layers may be removed during domain adaptation and then reinserted for noise adaptation. However, in other embodiments, DA layers 242*a*, 242*b* for a new domain may be inserted and trained in an NMT architecture 200 with MR layers 240*a*, 240*b* trained using noisy data from out-of-domain (i.e., data that does not belong to the same domain as the model being trained), e.g., for transfer learning. "Removal" of one or more layers may include removing or bypassing such layers.

Training data may optionally be provided at 304 for noise adaptation and domain adaptation, if suitable training data is not already available. For example, clean (non-noisy), in-domain data for adapting machine translation to a particular domain may be provided or generated from a suitable machine translation corpus (or other corpus, such as a speech-to-text corpus with translations) or other source (or multiple such sources).

Noise specific data may be generated, for instance, from all or a portion of the clean data. For example, the clean data may be used as an input to a source of noisy data in one or more modalities to generate noisy data for the respective modalities. In an example training method, to create a noisy ASR version of a dataset, audio from a speech-to-text dataset can be transcribed using an off-the-shelf ASR system (such as SpeechBrain). Noisy OCR data can be created by printing original text (e.g., transcriptions) to images, and using an OCR system to extract the text from the images. Noisy UGC data can be created by generating perturbations in original text (e.g., transcriptions) to simulate typos, etc., Data may be separated as needed into clean and noise specific data for training.

Alternatively or additionally, noisy data may be generated from one or more noise sources, such as but not limited to ASR, OCR and UGC data. The noisy data can then be modified, e.g., corrected or cleaned, to generate clean data. Generated clean data in a first language can be used to provide generated, e.g., translated, clean data in a second language (or vice versa). In general, clean data in a first language can be used to generate, directly or indirectly, clean or noisy data in a second language, and noisy data in a first language can be used to generate, directly or indirectly, clean or noisy data in a second language, and the resulting data can be used as clean data or noisy data of a particular mode for training.

For adapting the pretrained NMT model 200 for a (e.g., new) domain, the domain adapter layers 242*a*, 242*b* can be injected into the pretrained NMT model 200 at 306. For instance, as shown in FIG. 2 and disclosed herein, the DA layers 242*a*, 242*b* may be injected between the encoder feedforward layer 222 and the encoder output 210, and between the decoder feedforward layer 232 and the decoder output 212, for learning domain adaptation, while the parameters of the pretrained NMT model are frozen. The parameters of the domain adapter layers 242*a*, 242*b* may be initialized in any suitable manner, and the parameters of the remaining pretrained NMT model to be adapted may be kept frozen.

The domain adapter layers 242a, 242b are trained at 308 to learn a domain adaptation task on the clean in-domain data. For instance, the parameters of the NMT model 200 containing the domain adapter layers 242a, 242b (but preferably with the MR layers 240a, 240b removed) are frozen. The NMT model 200 is trained on a machine translation task on the clean in-domain data (e.g., provided via multimodal noisy input 206) to optimize the parameters of the domain adapter layers 242a, 242b.

At 310, the (trained) domain adapter layers 242a, 242b injected into the NMT model 200 are frozen alongside the other parameters of the NMT model. Then, at 312, one or more of the individual noise adapters 260, 262, 264 are injected at 312 into the NMT model, i.e., between the encoder feed-forward layer 222 and the domain adapter layers 242a, and between the decoder feed-forward layer 232 and the domain adapter layer 242b. At least one individual noise adapter 260, 262, 264 may be provided for each type of noise for which the NMT model 200 is to be particularly adapted.

The individual noise adapters 260, 262, 264 are trained at 314 on a noise adaptation task to optimize their parameters. Each noise adapter 260, 262, 264 is preferably trained separately and only on the specific type of noise associated with that noise adapter. Each noise adapter may be inserted into the NMT architecture 200 and trained incrementally, and then may be removed (including bypassing) or remain in the NMT model with its parameters frozen. For example, for training of an individual noise adapter, e.g., ASR noise adapter 260, on a type of noise suitable for that noise adapter, the other individual noise adapters, e.g., OCR noise adapter 262, UGC noise adapter 264, may be either be removed from the NMT architecture or be inserted in the NMT architecture with their parameters frozen. After training, the trained noise adapter 260 may either be removed from the NMT architecture 200, or remain in the NMT architecture with the parameters for the noise adapter 260 being frozen, while the next noise adapter, e.g., 262, is inserted (if necessary) and trained similarly on a type of noise suitable for that noise adapter, and likewise with noise adapter 264.

The individual noise adapters 260, 262, 264, may be trained on a noise adaptation task. For example, to adapt an individual noise adapter configured for a particular mode (e.g., OCR noise adapter 260), the NMT architecture 200 may be trained on a machine translation task using noisy data from the associated mode (e.g., generated using OCR) to update the parameters of the noise adapter while the remaining parameters of the NMT architecture remain frozen.

With the domain adapter layers 242a, 242b and the one or more individual noise adapters 260, 262, 264 being separately learned, at 316 the trained domain adapter layers and the trained noise adapters are loaded into the overall NMT model 200 (if not already loaded during noise adaptation at 314, as provided above) and are recomposed at runtime for decoding. An example method for recomposing the individual noise adapter layers 260, 262, 264 when the source of noise is known (or expected) is to dynamically route their outputs at runtime. When training the individual noise adapters 260, 262, 264, for instance, the particular noise source may be known by design. During runtime, a source of noisy data may be identified, for instance, in any suitable manner, nonlimiting examples including processing an API call, processing a received code or device identifier, processing metadata, etc.

For example, to process an OCR input (inputs with OCR-generated noise) provided via noisy multimodal input 206 in the example adapted NMT model 200 shown in FIG. 2, data in the encoder 202 is forwarded through the attention mechanism of the encoder including self-attention layer 220 (which may be a multi-head attention mechanism), the encoder feed-forward layer 222, the OCR noise adapter 262 in the MR layer 240a, and then the domain adapter 242a. Data in the decoder 204 is forwarded through the attention mechanisms (decoder self-attention layer 222 and cross-attention layer 234, each of which may be multi-head attention mechanisms), the decoder feed-forward layer 232, the OCR noise adapter 262 in the MR layer 240b, and the domain adapter 242b. Similarly, to process an ASR input (inputs with ASR-generated noise), the data in the encoder 202 and the decoder 204 is forwarded through the attention mechanisms (self-attention layer 220 inside the encoder 202, and the self-attention layer 222 and cross-attention layer 234 inside the decoder 204), the feed-forward layers 222, 232, the ASR noise adapter 260 in the MR layer 240a, 240b, and the domain adapter 242a, 242b, and so on.

Such methods may be optimal when the source of noise is known or expected. However, to better process unknown sources of noise or possibly clean data (an additional noise source), multimodal fusion layers 270 may be provided in the MR adapter layers 240a, 240b to combine what was learned by the individual noise adapters 260, 262, 264 in any useful manner. The multimodal fusion layers 270 may be separately trained at 318 to optimize parameters.

One example multimodal fusion layer 270, referred to herein as a fast fusion (FF) module, learns a linear projection W from a concatenation of the output of all of the individual noise adapters (H) 260, 262, 264 to the encoder and decoder domain adapter 242a, 242b embedding size ($d_m$), followed by a residual connection x 268. It will be appreciated that the noise adapter outputs below are merely examples, and others are possible.

$$FF(H) = W(Concat(H)) + x$$

$$H : \{h_{asr}, h_{ocr}, h_{ugc} \ldots , h_{noise_n}\}$$

$$W : \mathbb{R}^{|H| \times d_m} \to \mathbb{R}^{d_m}$$

The example fast fusion module can be learned on a mix of various (e.g., all) types of noises. Everything except for the FF model projection W may be frozen inside the NMT model 200 during the training at 318.

Another example multimodal fusion layer, referred to as a multi fusion (MF) module, also merges or combines the knowledge from all of the individual noise adapters 260, 262, 264. In MF, an attention mechanism is implemented to learn how to combine the various adapters. Some example attention mechanisms are disclosed in Adapter Fusion: Pfeiffer et al., Adapterfusion: Non-destructive task composition for transfer learning, In EACL, 2021.

In an example multimodal fusion layer 270 incorporating multi fusion, the attention mechanism may be embodied in a multi-head attention mechanism, e.g., as provided in the transformer disclosed in the '978 patent and in Vaswani et al., Attention is all you need, In NIPS, 2017, and in U.S. Pat. No. 10,452,978 may be used for learning. For instance, several attention heads may be learned on a partition of the embedding space formed by the output of the individual noise adapters 260, 262, 264, and then followed by a residual x.

$$MF(Q, K, V) = Concat(\text{head}^1, \ldots, \text{head}^M) + x$$

$$\text{head}^{i \in [1,M]} = \text{softmax}\left(\frac{QK^T}{\sqrt{d_k}}\right) V$$

$$= \text{softmax}\left(\frac{x \cdot H_R^T}{\sqrt{d_k}}\right) H_R$$

Where $d_k$ is $d_m$ divided by the number of attention heads M.

As with the fast fusion module, the multi fusion module can be learned on a mix of all types of noise.

The example multimodal fusion layers 270 can be provided to address with the source of noise transparently, i.e., to address the input when the source of noise is unknown. Though example sources of noise and new domains are described herein for illustrating inventive features, it will be appreciated that example models can extend to inventive aspects to other sources of noise and new domains.

Experiments

A multimodal dataset was built for experiments starting with the Multilingual TEDx (mTEDx) corpus, as disclosed in Salesky et al., "The Multilingual Tx corpus for speech recognition", in INTERSPEECH, 2021, which is a multilingual corpus created from TEDx talks and suited for speech recognition and machine translation tasks. The corpus is composed of audio recordings and their human provided transcriptions in eight languages (Spanish, French, Portuguese, Italian, Russian, Greek, Arabic, German) and translations into up to five languages (English, Spanish, French, Portuguese, Italian). Translations in twelve language pairs (Fr to En; Fr to Es; Fr to Pt; It to En; It to Es; Es to En; Es to Fr; Es to It, Es to Pt, Pt to En; Pt to Es; El to En) were obtained.

From the initial mTEDx Corpus, four versions of the dataset were created to simulate clean data and noisy data coming from various sources (images, speech, and web). The clean and noisy data were generated as follows:

The human transcripts and their translations were used as the clean, in-domain dataset.

To create the Noisy ASR version of the experimental dataset, the audio files from the original corpus were used and transcribed using an off-the-shelf ASR system, SpeechBrain. The mTEDx files were transcribed for French and Italian, using available pretrained models for SpeechBrain. The Noisy ASR dataset thus contained five language pairs: Fr to En; Fr to Es; Fr to Pt; It to En; and It to Es. Outside of usual ASR errors, the Speechbrain model only outputted lowercase text.

To create the Noisy OCR data from the mTEDx corpus, the human transcriptions were printed to images. An OCR system, using CRAFT as a segmenter (Baek et al., Character region awareness for text detection. CoRR, abs/1904.01941.2019) and CRNN (Shi et al., An end-to-end trainable neural network for image based sequence recognition and its application to scene text recognition. CoRR, abs/1507.05717.2015) as a recognizer, trained on Latin, Greek, and Koran alphabets (case sensitive) to extract back the transcripts from the images.

To simulate User Generated Content (UGC) such as found on the web, NL-Augmenter (Dhole et al., Nl-augmenter: A framework for task-sensitive natural language augmentation2021) was used to generate perturbations in the original mTEDx transcriptions. Another perturbation was used to simulate typos based on keyboard layouts.

Figure 4:
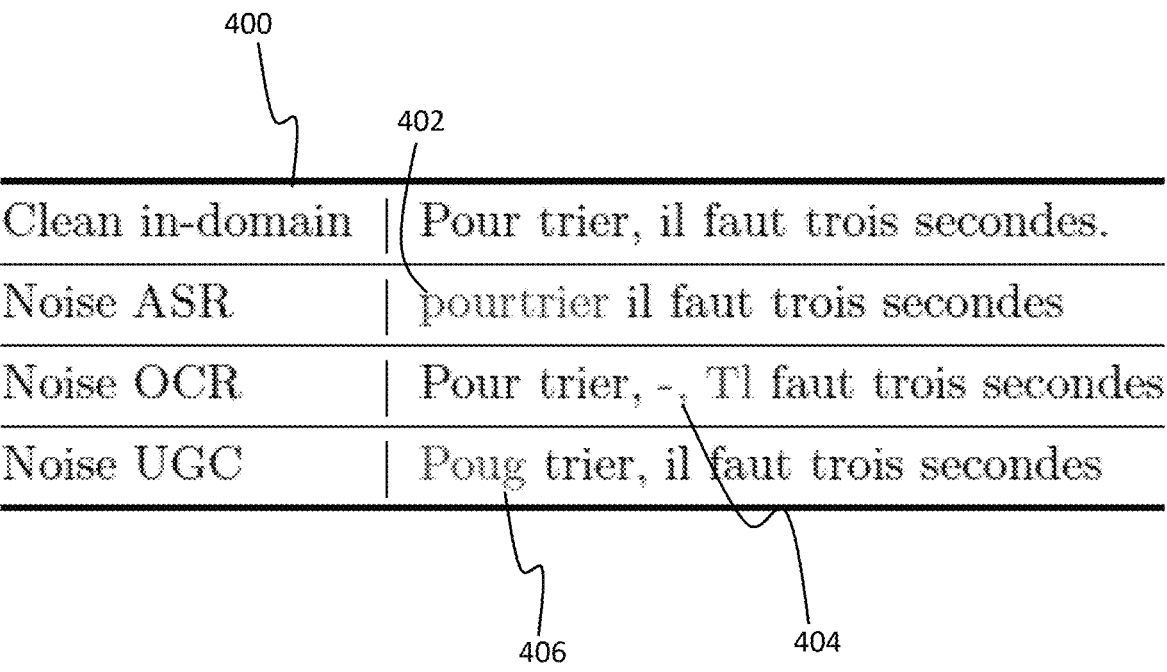
FIG. 4 shows an example of data from multi-modal versions.

An example of data from multi-modal versions is shown in FIG. 4, including a clean in-domain translation 400, and noisy translations from speech (ASR), images (OCR), and web (UGC) noise sources, including indicated noise (errors) for ASR 402, OCR 404, and UGC 406. For evaluation, SacreBLEU was used on the test set to evaluate the translation quality and report BLEU and chrF scores.

Pretrained NMT Model: As a baseline, the experiments trained a single multilingual NMT model that was trained on a large out-of-domain dataset. ParaCrawl v.7.1 (Banon et al., ParaCrawl: Web-scale acquisition of parallel corpora. In ACL, 2020) was used, and the nineteen highest-resource language paired with English were selected. A multi-parallel corpus was built by aligning all pairs of languages through their English side.

A shared byte pair encoding (BPE) model was trained with 64k merge operations and inline casing, as disclosed in Berard et al., Naver Labs Europe's systems for the wmt19 machine translation robustness task, In WMT, 2019, by sampling from this data with temperature 5. The encoder/decoder was set to contain N=6 layers. The embedding dimensions of all the input and output layers were set to $d_m=1024$. The number of heads in all multi-head modules was set to M=8. The label smoothing was set at 0.1, and the dropout was 0.1. The Adam optimizer was used with $\beta_1=0.9$, $\beta_2=0.98$. The learning rate was set at 0.0005, with a warm-up step of 8,000. The model was trained for 120k steps, with joint BPE vocabularies of size 16k. The evaluation was performed every 20k steps, and the best checkpoint was selected on the average of the validation loss.

Domain adaptation: Freezing the pretrained multilingual NMT model, the domain adapter (DA) layers (corresponding to domain adapter layers 242a, 242b) were fine-tuned on the clean in-domain dataset to create a domain-adapted NMT model. The same parameters were kept as for the pretrained model, and the DA was set to a size of 1024. The DA was fine-tuned for 3k steps with validation every 200 steps. The best checkpoint was saved according to the average of validation loss.

Noise adaptation: Keeping the DA setup fixed, three types of noise adapters (NAs) were fine-tuned with their respective noisy datasets: ASR NA, trained on the Noisy ASR data (corresponding to ASR noise adapter 260); OCR NA, trained on the Noisy OCR data (corresponding to OCR noise adapter 262) and UGC NA, trained on the Noisy UGC data (corresponding to UGC noise adapter 264). The same parameters were kept for the model, and the NA layers were set to have a size of 1024.

Multimodal fusion: An additional multimodal fusion layer (corresponding to multimodal fusion layer 270) was integrated below the domain adapters to merge the three experimental fine-tuned NAs. During training, only the multimodal fusion layer was fine-tuned with a merge of the noisy multimodal datasets while keeping the rest frozen. Multi Fusion and Fast Fusion were tested as example fusion layers. For a baseline, Adapter Fusion, as disclosed in Pfeiffer et al., Adapterfusion: Non-destructive task composition for transfer learning. In EACL, 2021, was also tested.

Joint learning of domain and noise: To compare experimental solutions with previously disclosed joint learning of noise and domain with Adapter Layers, the experiments also trained a single adapter layer on all types of data, clean and noisy, as disclosed in Berard et al., Naver Labs Europe's participation in the robustness, chat, and biomedical tasks at wmt 2020, In WMT, 2020.

Real versus synthetic noise: To assess the differences between realistic and synthetic noise, an adapter layer was also trained with basic random noise injection as disclosed in Berard et al., 2020. The random noise injection included noise such as common spelling errors, punctuation substitutions, letter swaps, spaces around punctuation, and accent removal.

Compositionality and Transfer Learning: To test the ability to compose DAs and NAs, e.g., for transfer learning, a domain adapter was also trained on another domain, Covost2 (Wang et al., "Covost 2: A massively multilingual speech-to-text translation corpus", in ArXiv, abs/2007.10310, 2020), which is a speech translation dataset created from Common Voice. As shown in the transfer learning architecture 500 in FIG. 5, a domain adapter layer 502 was trained only on clean Covost data, while the noise adapters 504, 506, 508 were trained only on noisy data from mTEDx clean data (domain adapter 510 for mTEDx was not used for the example transfer learning). The noise adapters 504, 506, 508 were incorporated into a multimodal robustness layer 512 including a multimodal fusion layer 514. The test was performed on noisy Covost data created in the same way as the noisy mTEDx data.

Results

Figures 5, 9:
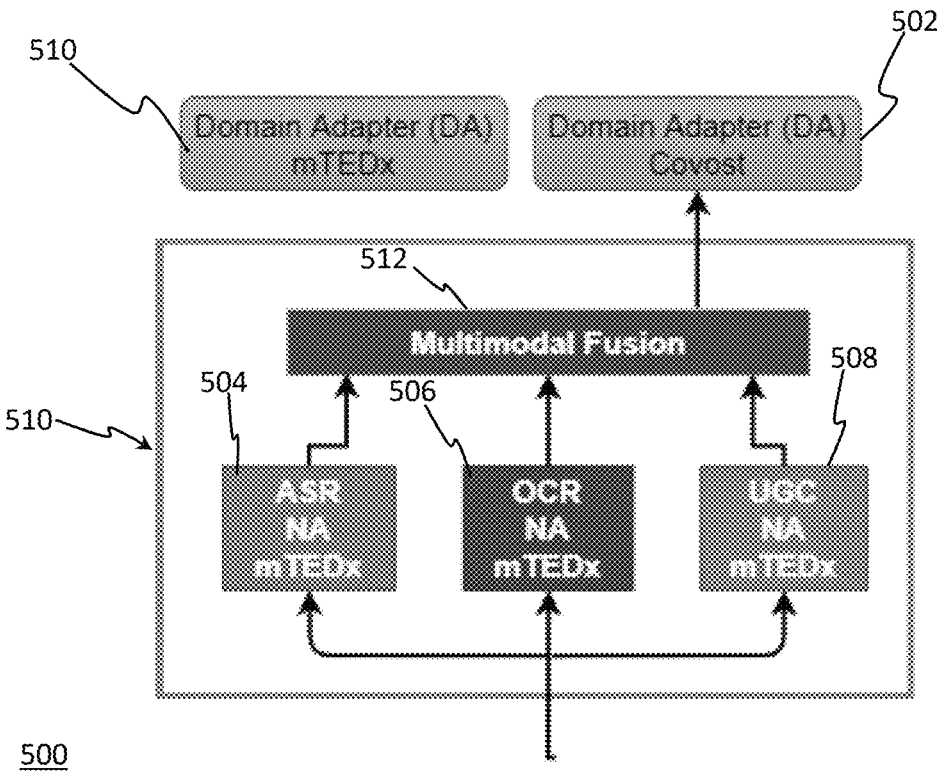
FIG. 5 shows an example transfer learning architecture including a multimodal robustness layer and a domain adapter.
FIG. 9 shows an impact of noisy data on a generic NMT model and an example domain adapted model that only saw clean data.

Multimodal Noise: FIG. 9 shows an impact of noisy data on a generic NMT model and an example domain adapted model that only saw clean data. The experimental domain adapted (DA) model on clean mTEDx data performed better than the generic NMT model. There was an impact of noisy data on these strong baselines: both suffered severely from noise, with losses going from (−23.84) to (−12.09) BLEU points depending on the noise type. In the experiments, the ASR system seemed to be the most noisy, followed by the OCR output, and finally the UGC perturbations, which seemed to have the least impact in terms of BLEU loss. It was also observed that the experimental DA model trained on clean mTEDx data was still on average better than the generic model when faced with noisy multimodal data (+4.2 BLEU on average).

Noise adaptation efficiency: FIG. 6 shows BLEU and chrF scores on noisy ASR data, FIG. 7 shows corresponding correBLEU and chrF scores on noisy OCR data, and FIG. 8 shows corresponding BLEU and chrF scores on noisy UGC data. In FIGS. 6-8, Multilingual NMT out-of-domain is a generic NMT model trained on out-of-domain Paracrawl data. DA (Clean data) is a domain adapted model according to an example embodiment trained on clean mTEDx data. DA (Synthetic Noise) is an adapter layer according to an example embodiment trained on synthetically generated noisy mTEDx data. DA (Real Noise) is the same but trained on the real type noisy mTEDx data. DA+X-NA is an experiment showing a decomposed DA and a specific NA for noise X. DA-(AF|FF|MF) are decomposed DA and NA with an example fusion mechanism for when the type of noise is unknown and the model combines the noise adapters present in the model. Italics show the best scores in an Oracle mode (when the noise source is known) and in bold are the best scores for the Blind mode (when the type of noise in input is not known).

As shown in FIGS. 6-8, all of the dedicated noise adaptation methods according to example embodiments outperformed the generic NMT model and the DA model. For instance, for the ASR noise (FIG. 6) the single DA trained with synthetic noise was outperformed by the DA trained with the real noise (+3.4 BLEU). The same conclusion can be made for the other types of noise: OCR (FIG. 7) and UGC (FIG. 8).

Experimental methods learning separately the DA and the NA provided results that were competitive with methods that jointly learned domain and noise. On average, experimental methods provided effectively the same quality, but with added benefits of, for instance, easy extension to new domains or new types of noise, and the ability to handle inputs with unknown types of noise, as described in more detail below.

Multimodal Fusion Mechanisms

To illustrate benefits of example transfer learning features, it is useful to consider how input containing an unknown type of noise may be addressed. Referring again to FIG. 6, when the exact type of noise in the input was unknown, it is shown that Adapter Fusion, the current state-of-the-art for fusing adapter layers, lost (−0.5) BLEU when compared with an oracle system (where the right adapter was chosen for the type of input). Fast Fusion (FF) and Multi Fusion (MF) components, which are examples of the multimodal fusion layers 270 provided herein, obtained better results with a relative improvement of (+0.3) BLEU and (+0.5) when compared with Adapter Fusion. The example MF solution was as effective as selecting the oracle Adapter layer. The same observation can be made for the other two types of noises: FF and MF outperformed the AF technique and bridged the gap with the oracle systems, with an average of only 0.16 BLEU points difference.

Transfer learning (new domain): As shown in Table 1 below, when a new domain adapter was trained separately on clean data from Covost, as with the observations on mTEDx, the Domain Adapted model suffered from noisy input (−13.9 BLEU). However, when this new DA was combined with a previously trained Noise Adapter, which was trained only on the Noisy mTEDx data, as shown in the transfer learning architecture 500 in FIG. 5, most of the losses were regained, to 46.6 BLEU on noisy Covost data compared to 47.8 on clean Covost data (only −1.2 BLEU points loss).

TABLE 1

| Model | Clean covost | Noisy covost |
|---|---|---|
| DA(Covost) | 47.8 | 33.9 |
| DA(Covost) + NA (mTEDx) | 47.8 | 46.6 |

The results in Table 1 show that example adaptation methods allow one to easily extend an example adapted NMT model to new domains while still being able to deal with specific, already known, types of noises. This type of extension is much more costly for methods doing a joint learning of domain and noise. For example, in case of joint learning, to handle 6 domains and 4 types of noises (e.g., UGC, OCR, ASR, and Clean), one would need to train 6×4=24 adapter layers, while an example method herein can involve merely 6+4=10 adapter layers to provide a similar level of robustness to all domains.

Transfer learning (new noise): To assess the ability of the example fusion mechanisms, FF and MF, to address an unknown type of noise, they were evaluated on a synthetic type of noise, which was different from UGC, OCR, and ASR. This synthetic type of noise, similar to that disclosed in Berard et al., 2020, consisted of punctuation substitutions, letter swaps, spaces around punctuation, accent removal, and others.

FIG. 10 shows results of an evaluation of transfer learning abilities of fusion layers according to example embodiments to an unknown type of noise (synthetic). AF/FF/MF are trained on noisy (UGC/OCR/ASR) data and tested on unknown synthetic noise. As shown in FIG. 10, the results from the generic NMT model and the DA model again suffered from this new type of noise. When attempting to address this new type of noise, without retraining any of the example components, the FF and MF both outperformed AF. Both FF and MF also converged faster in terms of training steps than AF, providing good results after only a few hundred steps of tuning.

Methods for Transfer Learning

Figure 11A:
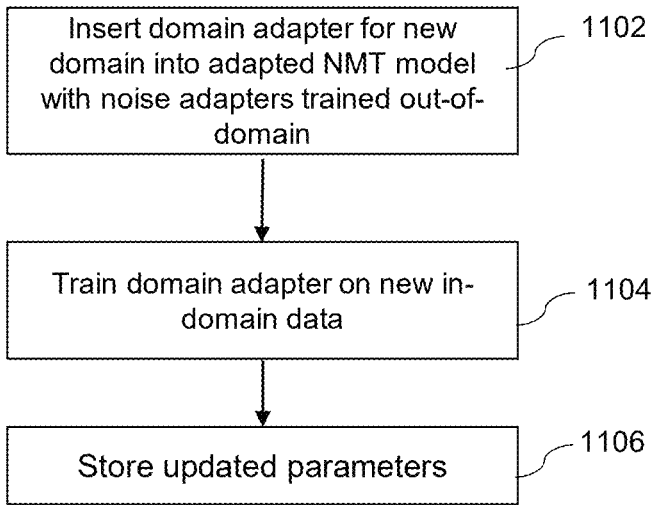
FIG. 11A shows an example method for adapting a previously trained and adapted NMT model for a new domain.

FIG. 11A shows an example method 1100 for adapting a previously trained and adapted NMT model for a new domain. A domain adapter for a new domain is inserted at 1102 into a trained and adapted NMT architecture, which includes noise adapters trained on noisy out-of-domain data; i.e., data from a domain other than the new domain, such as in the transfer architecture 500. The domain adapter is trained on clean new in-domain data at 1104 (the remaining layers, such as shown in architectures 200, 500 may be frozen), and updated parameters for the NMT architecture including the trained domain adapter are stored at 1106.

Figure 11B:
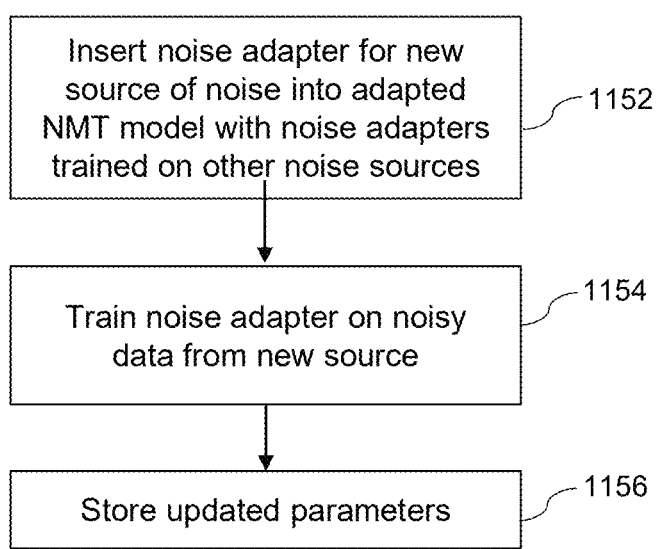
FIG. 11B shows an example method for adapting a previously trained and adapted NMT model for a new noise source or mode.

FIG. 11B shows an example method 1150 for adapting a previously trained and adapted NMT model for a new noise source or mode. A noise adapter for a new noise source is inserted at 1152 into a trained and adapted NMT architecture, e.g., NMT architecture 200, which includes noise adapters trained on previously known noise sources. The noise adapter is trained on the data from the new noise source at 1154 (the remaining layers may be frozen), and updated parameters for the NMT architecture including the trained noise adapter are stored at 1156.

Method of Processing Text

Figure 12:
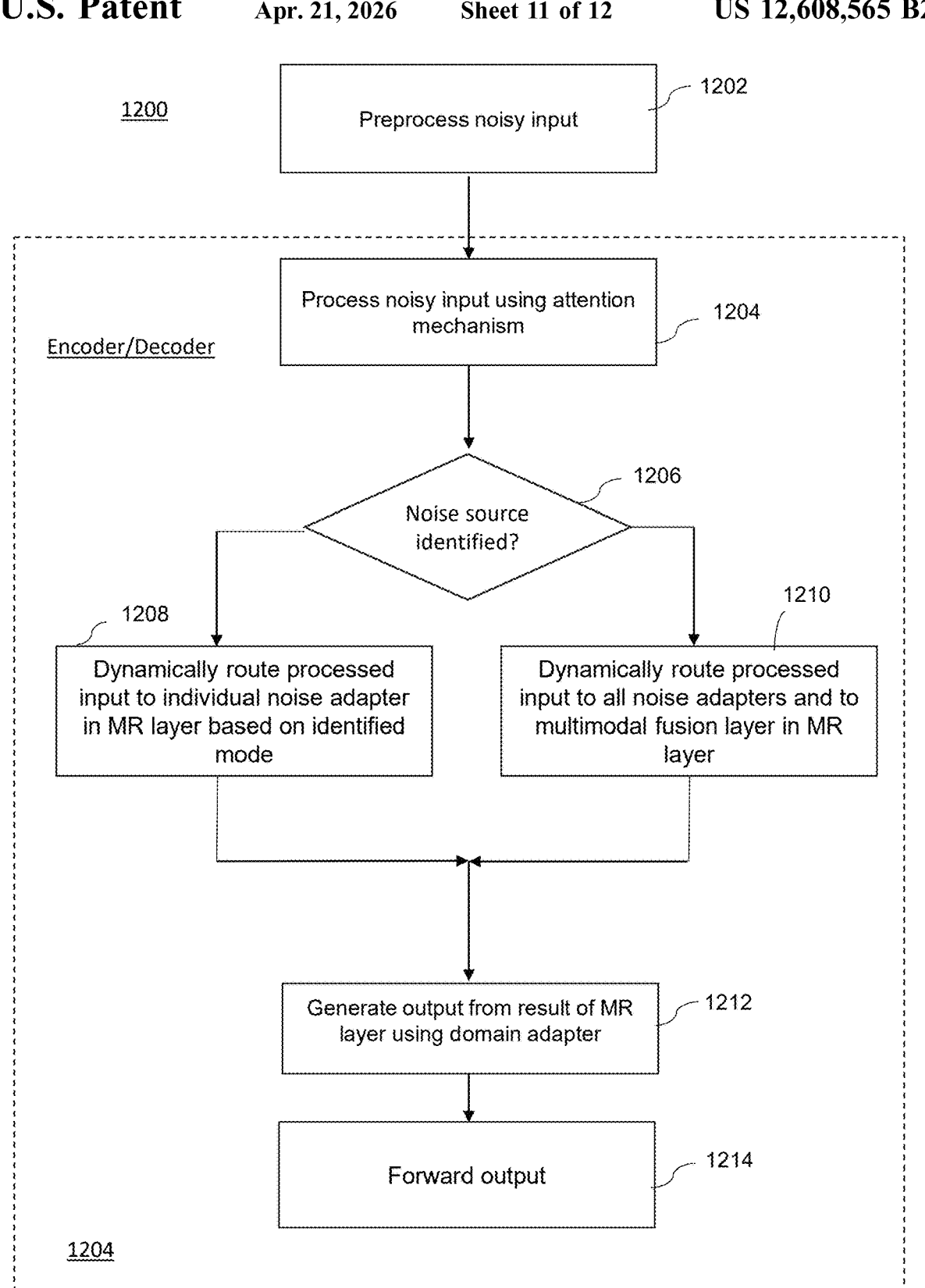
FIG. 12 shows an example method for processing a text input using a trained and adapted multimodal NMT model.

FIG. 12 shows an example method 1200 for processing a text input using a trained multimodal NMT model such as the NMT architecture 200. The NMT architecture includes an encoder and decoder such as encoder 202 and decoder 204, and further includes trained individual noise adapters such as adapters 260, 262, 264 and domain adapters such as domain adapters 242a, 242b. The NMT architecture optionally includes a fusion layer such as multimodal fusion layer 270.

The trained multimodal NMT model, e.g., the NMT model 200 receives a noisy input from a domain, such as text data or data from which text may be derived (images, speech, etc.). The domain may be the domain for which the domain adapter 242a, 242b has been trained, or a different domain. The noisy input, e.g., input 206, may be preprocessed at 1102, e.g., vectorized, embedded, etc., such as is known in NMT processing, e.g., using transformer-based or other attention-based encoder-decoder models.

A noisy input is processed, in the encoder and the decoder, at 1204. For example, at 1204 a noisy input from the multimodal noisy input 206 after preprocessing for the encoder 202, or from the encoder output 210 for the decoder 204, is processed using an attention mechanism. The attention mechanism may include the encoder self-attention 220 and feedforward layers 222 in the encoder 202 and the cross-attention 234 and feedforward layers 232 in the decoder 204. Methods for processing inputs for machine translation will be appreciated using attention mechanisms will be appreciated by those of ordinary skill in the art.

In operation of the multimodal robustness (MR) layer 240a, 204b, if at 1206 a trained noise adapter 260, 262, 264 in the NMT architecture 200 can be identified that corresponds to a mode noise source for the noisy input at 1104, data from the attention mechanism is dynamically routed through the identified trained noise adapter encoder at 1208. If, on the other hand, a trained noise adapter cannot be identified that corresponds to a noise source for the noisy input at 1104, e.g., if either the noise source cannot be identified or the noise source does not correspond to one of the trained adapters, the data from the attention mechanism is routed at 1210 through all of the trained noise adapters and through the multimodal fusion layer 270. The result of the multimodal robustness layer 240a, 240b is routed at 1212 through the domain adapter, which generates an output at 1214 in the encoder and the decoder, at 1108. The output of the last layer N of the encoder 202, for instance, is provided to the cross-attention layer 234 of the decoder 204, while the output of the last layer N of the decoder is provided as a next sequence output (e.g., token of translated text). The output can be printed, stored, transmitted, provided for display on a display, displayed, used in downstream processing, etc.

Network Architecture

Figure 13:
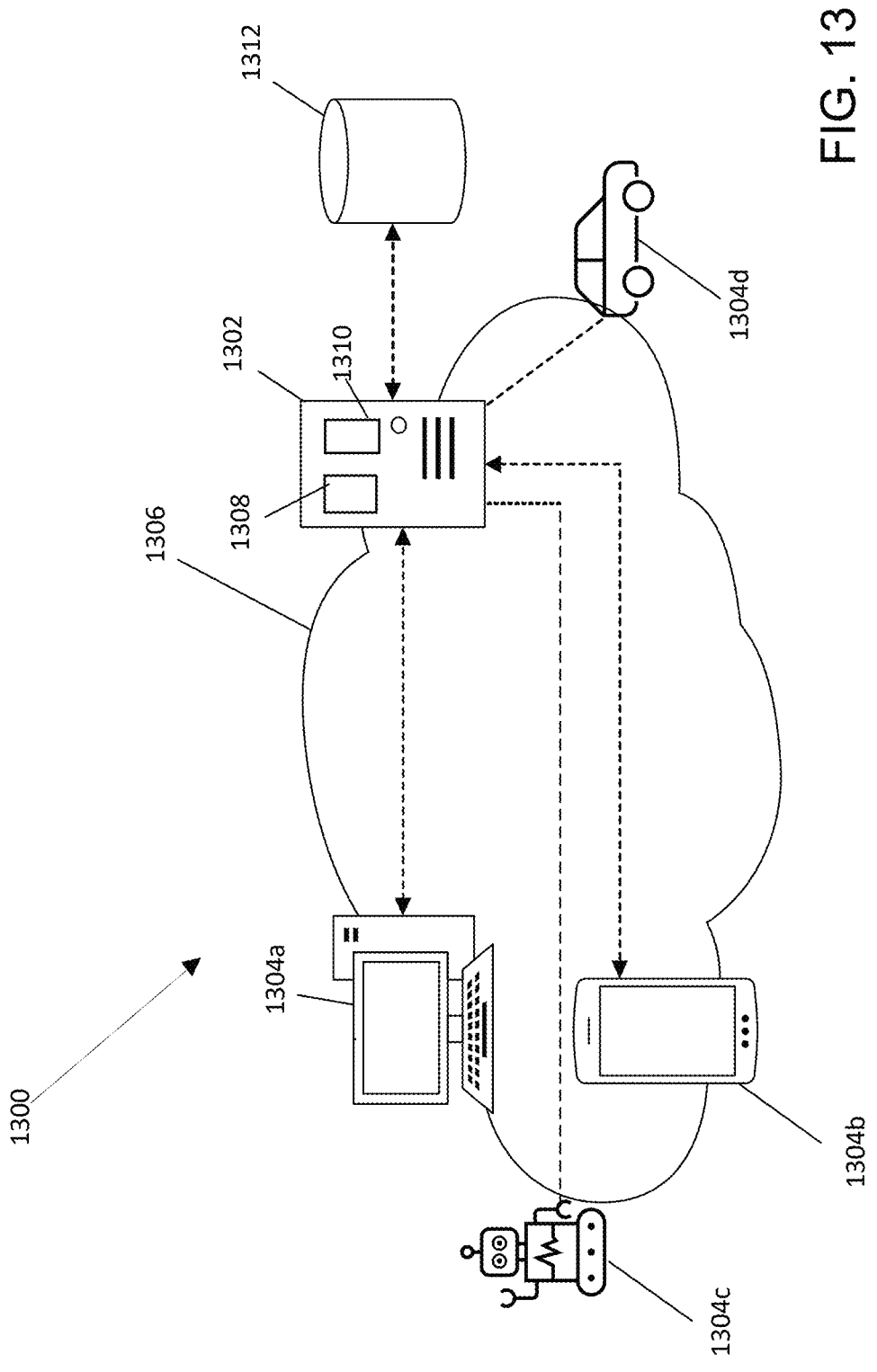
FIG. 13 shows an example network architecture for performing example methods.

Example systems, methods, and embodiments may be implemented within a system or network architecture 1300 such as the architecture illustrated in FIG. 13, which includes a server 1302 and one or more client devices 1304 that communicate over a network 1306 which may be wireless and/or wired, such as the Internet, for data exchange. The server 1302 and the client devices 1304 can each include one or more processors, e.g., processor 1308 and memory, e.g., memory 1310 (shown by example in server 1302), such as but not limited to random-access memory (RAM), read-only memory (ROM), hard disks, solid state disks, or other non-volatile storage media. Memory 1310 may also be provided in whole or in part by external storage in communication with the processor 1308.

The text-to-text model, e.g., NMT model 200, for instance, may be embodied in the processor 1308 or other processor in the server 1302 and/or client devices 1304. It will be appreciated that the processor 1308 can include either a single processor or multiple processors operating in series or in parallel, and that the memory 1310 can include one or more memories, including combinations of memory types and/or locations. Server 1302 may also include, but are not limited to, dedicated servers, cloud-based servers, or a combination (e.g., shared). Storage, e.g., a database, may be embodied in suitable storage in the server 1302, client device 1304, a connected remote storage 1312 (shown in connection with the server 1302, but can likewise be connected to client devices), or any combination.

Client devices 1304 may be any processor-based device, terminal, etc., and/or may be embodied in a client application executable by a processor-based device, etc. Client devices may be disposed within the server 1302 and/or external to the server (local or remote, or any combination) and in communication with the server. Example client devices 1304 include, but are not limited to, autonomous computers 1304a, mobile communication devices (e.g., smartphones, tablet computers, etc.) 1304b, robot 1304c, autonomous vehicle 1304d, wearable devices, virtual reality, augmented reality, or mixed reality devices (not shown), or others. Client devices 1304 may be configured for sending data to and/or receiving data from the server 1302, and may include, but need not include, one or more output devices, such as but not limited to displays, printers, etc. for displaying or printing results of certain methods that are provided for display by the server. Client devices may include combinations of client devices.

In an example training method (including adapting methods), the server 1302 or client devices 1304 may receive a dataset from any suitable source, e.g., from memory (as nonlimiting examples, internal storage, an internal database, etc.), from external (e.g., remote) storage 1312 connected locally or over the network 1306. The example training method can generate a trained NMT model that can be likewise stored in the server (e.g., memory 1310), client devices 1304, external storage 1312, or combination. In some example embodiments provided herein, training (including adapting) and/or inference may be performed offline or online (e.g., at run time), in any combination. Results can be output (e.g., displayed, transmitted, provided for display, printed, etc.) and/or stored for retrieving and providing on request.

In an example training (including adapting) method, the server 1302 or client devices 1504 may receive a dataset including text in one or more domains (previous or new, in-domain or out-of-domain) and in one or more languages from any suitable source including but not limited to the noisy and clean text sources provided herein, e.g., by local or remote input from a suitable interface, or from another of the server or client devices connected locally or over the network 1306. Trained models such as the example NMT model 200 can be likewise stored in the server (e.g., memory), client devices 1304, external storage 1312, or combination. In some example embodiments provided herein, training and/or inference may be performed offline or online (e.g., at run time), in any combination.

In an example NMT method during inference or runtime the server 1302 or client devices 1304 may receive input text in a first language from any suitable noisy or clean source, e.g., by local or remote input from a suitable interface (e.g., keyboard, mouse, stylus, touch pad, touch screen, microphone with ASR processing, OCR, etc.), or from another of the server or client devices connected locally or over the network 1306 and process the input using the example NMT model adapted using methods provided herein, to provide an output sequence of text in a second language. Results of processing by the adapted NMT model can be output, e.g., spoken, transmitted, displayed, provided for display, printed, and/or stored for retrieving and providing on request.

Generally, embodiments can be implemented as computer program products with a program code or computer-executable instructions, the program code or computer-executable instructions being operative for performing one of the methods when the computer program product runs on a computer.

The program code or the computer-executable instructions may, for example, be stored on a computer-readable storage medium.

In an embodiment, a storage medium (or a data carrier, or a computer-readable medium) comprises, stored thereon, the computer program or the computer-executable instructions for performing one of the methods described herein when it is performed by one or more processors and memory.

Embodiments described herein may be implemented in hardware or in software. The implementation can be performed using a non-transitory storage medium such as a computer-readable storage medium, for example a floppy disc, a DVD, a Blu-Ray, a CD, a ROM, a PROM, and EPROM, an EEPROM or a FLASH memory. Such computer-readable media can be any available media that can be accessed by a general-purpose or special-purpose computer system.

General

The foregoing description is merely illustrative in nature and is in no way intended to limit the disclosure, its application, or uses. The broad teachings of the disclosure may be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure may be implemented in and/or combined with features of any of the other embodiments, even if that combination is not explicitly described. In other words, the described embodiments are not mutually exclusive, and permutations of one or more embodiments with one another remain within the scope of this disclosure. All documents referred to herein are incorporated herein by reference in their entirety, without admission that any of these documents constitute prior art.

Each module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module. Each module may be implemented using code. The term code, as used above, may include software, firmware, and/or microcode, and may refer to programs, routines, functions, classes, data structures, and/or objects.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The systems and methods described in this application may be partially or fully implemented by a special purpose computer created by configuring a general purpose computer to execute one or more particular functions embodied in computer programs. The functional blocks, flowchart components, and other elements described above serve as software specifications, which may be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

It will be appreciated that variations of the above-disclosed embodiments and other features and functions, or alternatives thereof, may be desirably combined into many other different systems or applications. Also, various presently unforeseen or unanticipated alternatives, modifications, variations, or improvements therein may be subsequently made by those skilled in the art which are also intended to be encompassed by the description above and the following claims.

The invention claimed is:

1. A method for adapting a pretrained neural machine translation (NMT) model for translating text from a noisy input in a domain, the method comprising:
    training, using one or more processors, a domain adapter injected into the pretrained NMT model on clean in-domain data for adapting the pretrained NMT to the domain, wherein the pretrained NMT model comprises an encoder including an encoder attention mechanism and encoder feed forward layer and a decoder including a decoder attention mechanism and decoder feed forward layer;
    wherein said training a domain adapter comprises training the pretrained NMT model with the injected domain adapter on a machine translation task while the pretrained NMT model is frozen; and
    separately training, using one or more processors, each of a plurality of individual noise adapters injected into the pretrained NMT model, wherein each of the individual noise adapters is respectively trained on noisy input data from an individual noise source for adapting to the individual noise source;
    wherein said separately training each of a plurality of individual noise adapters comprises, for each of the individual noise adapters, training the pretrained NMT model with the injected individual noise adapter and the trained domain adapter injected in the pretrained NMT model on a machine translation task while the pretrained NMT model and the trained domain adapter are frozen.

2. The method of claim 1, further comprising:
    after said separately training each of a plurality of individual noise adapters, recomposing the trained individual noise adapters into the pretrained NMT model.

3. The method of claim 2, wherein said recomposing comprises:
    injecting a multimodal fusion layer downstream of the trained individual noise adapters; and
    training, using one or more processors, the injected multimodal fusion layer.

4. The method of claim 3, wherein said recomposing comprises, in each of the encoder and the decoder:
    using one or more processors, dynamically routing data from the feed forward layer to one of the trained individual noise adapters corresponding to an individual noise source if an individual noise source for the noisy input is detected; and
    using one or more processors, dynamically routing data from the feed forward layer to each of the trained individual noise adapters and to the multimodal fusion layer if an individual noise source for the noisy input is not detected.

5. The method of claim 4, wherein the multimodal fusion layer is configured to apply a learned linear projection to a concatenated output of all of the individual noise adapters.

6. The method of claim 5, wherein the multimodal fusion layer is further configured to combine the applied learned linear projection with a residual connection.

7. The method of claim 4, wherein the multimodal fusion layer comprises a multi-head attention mechanism that learns on an embedding space provided by an output of all of the individual noise adapters.

8. The method of claim 7, wherein the multimodal fusion layer is further configured to combine the multi-head attention mechanism with a residual connection.

9. The method of claim 4, wherein the individual noise adapters and the multimodal fusion layer are incorporated in a multimodal robustness layer injected in the encoder and the decoder between the feed forward layer and the injected domain adapter.

10. The method of claim 1, wherein the domain adapter is injected into the encoder and the decoder of the pretrained NMT model.

11. The method of claim 10, wherein in the encoder and the decoder the domain adapter is injected downstream of the feed forward layer.

12. The method of claim 11, wherein in the encoder and the decoder the plurality of individual noise adapters are injected downstream of the feed forward layer and upstream of the domain adapter.

13. The method of claim 1, wherein the pretrained NMT model is pretrained on out-of-domain data.

14. The method of claim 1, wherein each of a plurality of individual noise adapters injected into the pretrained NMT model on noisy in-domain data.

15. The method of claim 1, wherein the noise source comprises automated speech recognition (ASR), optical character recognition (OCR), or user generated content (UGC).

16. The method of claim 1, wherein said separately training each of a plurality of individual noise adapters uses noisy input data by applying the respective individual noise source to the clean in-domain data.

17. The method of claim 1, further comprising:
    removing the trained domain adapter from the adapted pretrained NMT;
    injecting a new domain adapter into the adapted pretrained NMT; and
    training, using one or more processors, the injected new domain adapter on clean data from a new domain while the adapted pretrained NMT otherwise remains frozen.

18. The method of claim 1, further comprising:

injecting a new individual noise adapter for a new noise source into the adapted pretrained NMT; and training, using one or more processors, the injected new individual noise adapter on noisy input data from the domain while the adapted pretrained NMT otherwise remains frozen.

19. The method of claim 1, wherein each of the individual noise adapters comprises a down-projection layer and an up-projection layer.

20. The method of claim 1, wherein each of the domain adapters comprises a down-projection layer and an up-projection layer.

21. A non-transitory computer-readable medium, on which is stored a computer program product comprising code instructions for executing a method for adapting a neutral machine translation (NMT) model for translating text from a noisy input in a domain comprising:

a pretrained encoder including an attention mechanism and a feed forward layer, the encoder receiving the noisy input and generating an encoder output;

a pretrained decoder including an attention mechanism and a feed forward layer, the decoder receiving the encoder output and generating a decoder output corresponding to translated text;

a domain adapter injected downstream of the feed forward layer in the encoder and the decoder, the domain adapter being trained on clean in-domain data; and a plurality of individual noise adapters injected into the encoder and the decoder downstream of the feed forward layer and upstream of said domain adapter, each of the individual noise adapters being separately trained on noisy input data from a respective individual noise source for adapting to the individual noise source;

wherein the domain adapter is trained while the pretrained encoder and the pretrained decoder are frozen; and wherein each of the individual noise adapters are trained while the pretrained encoder, the pretrained decoder, and the domain adapter are frozen.

22. The adapted NMT of claim 21, further comprising:

a trained multimodal fusion layer disposed downstream of the trained individual noise adapters and upstream of the domain adapter.

23. The adapted NMT of claim 22, wherein the adapted NMT is configured to:

dynamically route data from the feed forward layer to one of the trained individual noise adapters corresponding to an individual noise source if an individual noise source for the noisy input is detected; and dynamically route data from the feed forward layer to each of the trained individual noise adapters and to the multimodal fusion layer if an individual noise source for the noisy input is not detected.

24. The adapted NMT of claim 23, wherein the trained multimodal fusion layer is configured to apply a learned linear projection to a concatenated output of all of the individual noise adapters and to combine the applied learned linear projection with a residual connection.

25. The adapted NMT of claim 23, wherein the multimodal fusion layer comprises a multi-head attention mechanism that learns on an embedding spaced provided by an output of all of the individual noise adapters; and wherein the multimodal fusion layer is further configured to combine the multi-head attention mechanism with a residual connection.

26. The adapted NMT of claim 25, wherein the plurality of individual noise adapters and the trained multimodal fusion layer are incorporated into a multimodal robustness layer disposed in the encoder and the decoder upstream of the domain adapter and downstream of the feed forward layer.

27. The adapted NMT of claim 21, wherein each of the individual noise adapters comprises a down-projection layer and an up-projection layer.

28. The adapted NMT of claim 21, wherein each of the domain adapters comprises a down-projection layer and an up-projection layer.

29. An apparatus for adapting a pretrained neural machine translation (NMT) model for translating text from a noisy input in a domain comprising:

a non-transitory computer-readable medium having executable instructions stored thereon for causing one or more processors and memory to:

train a domain adapter injected into the pretrained NMT model on clean in-domain data for adapting the pretrained NMT to the domain, wherein the pretrained NMT model comprises an encoder including an encoder attention mechanism and encoder feed forward layer and a decoder including a decoder attention mechanism and decoder feed forward layer;

wherein said training a domain adapter comprises training the pretrained NMT model with the injected domain adapter on a machine translation task while the pretrained NMT model is frozen; and separately train each of a plurality of individual noise adapters injected into the pretrained NMT model, wherein each of the individual noise adapters is respectively trained on noisy input data from an individual noise source for adapting to the individual noise source;

wherein said separately training each of a plurality of individual noise adapters comprises, for each of the individual noise adapters, training the pretrained NMT model with the injected individual noise adapter and the trained domain adapter injected in the pretrained NMT model on a machine translation task while the pretrained NMT model and the trained domain adapter are frozen.

* * * * *